US012615541B2

(12) United States Patent
Shi et al.

(10) Patent No.: US 12,615,541 B2
(45) Date of Patent: Apr. 28, 2026

(54) METHODS AND APPARATUSES FOR END-TO-END QUALITY OF SERVICE FOR COMMUNICATION BETWEEN WIRELESS TRANSMIT-RECEIVE UNITS

(71) Applicant: InterDigital Patent Holdings, Inc., Wilmington, DE (US)

(72) Inventors: Xiaoyan Shi, Westmount (CA); Samir Ferdi, Kirkland (CA); Michelle Perras, Montreal (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 305 days.

(21) Appl. No.: 17/917,304

(22) PCT Filed: Apr. 6, 2021

(86) PCT No.: PCT/US2021/025926
§ 371 (c)(1),
(2) Date: Oct. 6, 2022

(87) PCT Pub. No.: WO2021/207165
PCT Pub. Date: Oct. 14, 2021

(65) Prior Publication Data
US 2023/0164619 A1     May 25, 2023

Related U.S. Application Data

(60) Provisional application No. 63/007,472, filed on Apr. 9, 2020.

(51) Int. Cl.
| | |
|---|---|
| *H04W 76/22* | (2018.01) |
| *H04W 28/02* | (2009.01) |
| *H04W 40/22* | (2009.01) |

(52) U.S. Cl.
CPC ....... *H04W 28/0268* (2013.01); *H04W 40/22* (2013.01); *H04W 76/22* (2018.02)

(58) Field of Classification Search
CPC . H04W 28/0268; H04W 40/22; H04W 76/22; H04L 47/24
See application file for complete search history.

(56) References Cited

U.S. PATENT DOCUMENTS

2022/0322135 A1* 10/2022 Xu ........................ H04W 40/22

OTHER PUBLICATIONS

Qualcomm (UE-to-UE Relay solution based on iP routing, S2-2001373, Jan. 2020).*
3GPP (Architecture enhancements for 5G System (5GS) to support Vehicle-to-Everything (V2:X) services, TS 23.287v16.1.0, Dec. 2019).*

(Continued)

*Primary Examiner* — Lakeram Jangbahadur
(74) *Attorney, Agent, or Firm* — Volpe Koenig

(57) ABSTRACT

Methods and apparatuses are described herein for end-to-end Quality of Service, QoS, for communication between Wireless Transmit-Receive Units (WTRUs), via a ProSe WTRU-to-WTRU relay. PCS QoS flows are established respectively between a source WTRU and the ProSe WTRU-to-WTRU relay, and between a target WTRU and the ProSe WTRU-to-WTRU relay. The ProSe WTRU-to-WTRU relay performs PCS QoS flow mapping between the source and the target WTRU.

7 Claims, 17 Drawing Sheets

(56) References Cited

OTHER PUBLICATIONS

3rd Generation Partnership Project; Technical Specification Group Services and System Aspects; Architecture enhancements for 5G System (5GS) to support Vehicle-to-Everything (V2X) services (Release 16), 3GPP TS 23.287 V16.1.0, Dec. 2019, 51 pages.

3rd Generation Partnership Project; Technical Specification Group Services and System Aspects; Procedures for the 5G System; Stage 2 (Release 16), 3GPP TS 23.502 V16.0.0, Mar. 2019, 420 pages.

Qualcomm Incorporated, et al., "UE-to-UE Relay Solution based on IP Routing", 3GPP Tdoc S2-2001373, SA WG2 Meeting #136AH, Incheon, Korea, Jan. 13-17, 2020, 4 pages.

Universal Mobile Telecommunications System (UMTS); LTE; Proximity-based services (ProSe); Stage 2 (3GPP TS 23.303 version 15.1.0 Release 15), ETSI TS 123 303, V15.1.0, Jul. 2018, 130 pages.

3rd Generation Partnership Project; Technical Specification Group Services and System Aspects; System Architecture for the 5G System; Stage 2 (Release 16), 3GPP TS 23.501 V16.0.0, Mar. 2019, 318 pages.

Ericsson, "Solution for UE-to-UE Relay Selection Without Relay Discovery", 3GPP Tdoc S2-2001371, 3GPP TSG-SA WG2 Meeting #136AH, Incheon, Korea, Jan. 13-17, 2020, 4 pages.

Qualcomm Incorporated et al., "UE-to-UE Relay Solution based on IP Routing", S2-2000573, SA WG2 Meeting #136AH, Incheon, Korea, Jan. 13-17, 2020, 4 pages.

* cited by examiner

Receive ID of target WTRU and QoS flow parameters for QoS configuration ⟋1100

Create New QoS Flow/Modify Existing ⟋1101

Transmit Link Modification Request to Target WTRU ⟋1102

Receive Link Modification Accept Message from Target WTRU ⟋1103

Receive Link Modification Request from Source WTRU ~1200

Transmit Link Modification Accept Message to Source WTRU ~1201

Retrieve ID of Target WTRU from Packets ~1202

Create New QoS Flow/Modify Existing ~1203

Transmit Link Modification Request to Target WTRU ~1204

Receive Link Modification Accept Message from Target WTRU ~1205

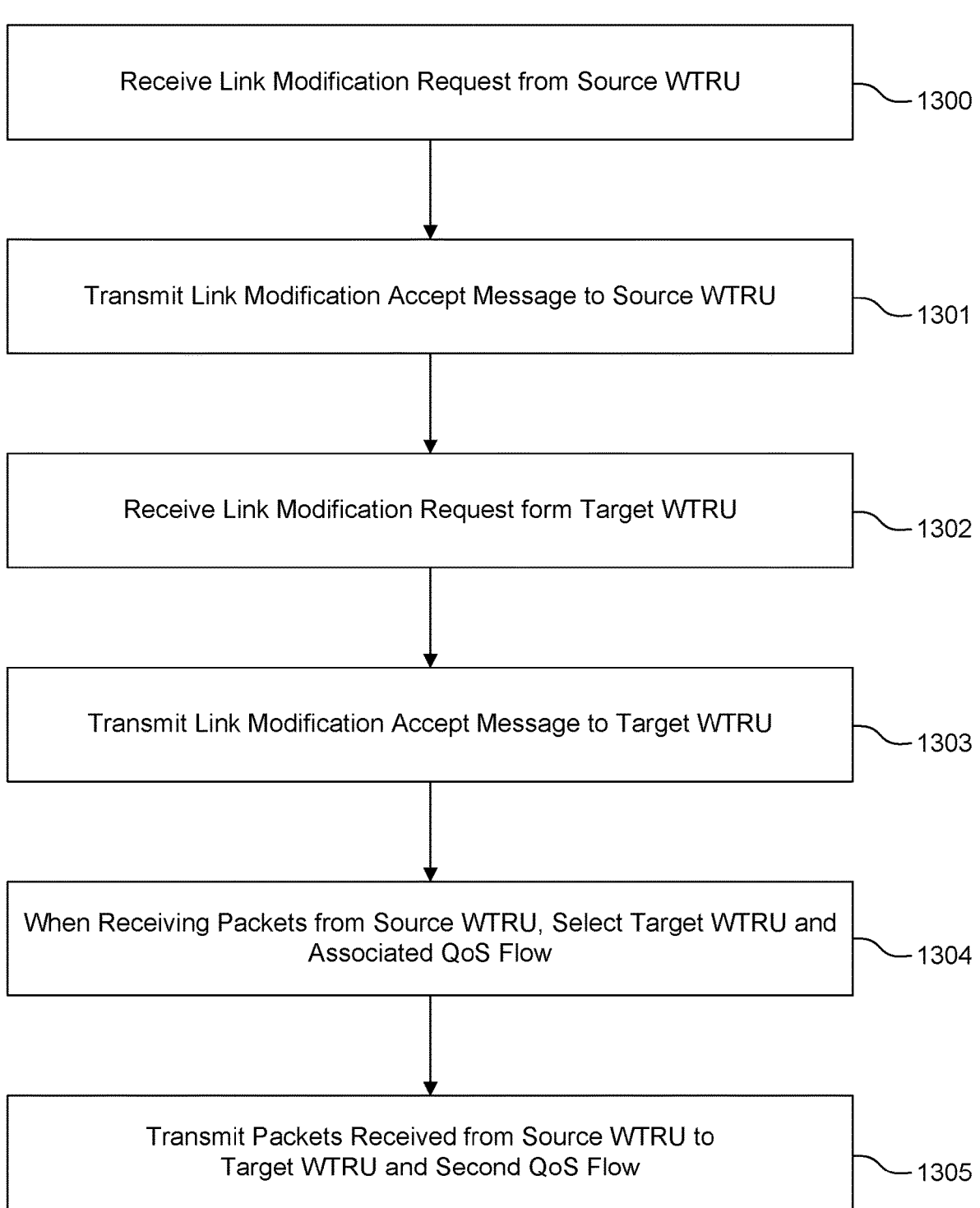

Receive Link Modification Request from Source WTRU ~1300

Transmit Link Modification Accept Message to Source WTRU ~1301

Receive Link Modification Request form Target WTRU ~1302

Transmit Link Modification Accept Message to Target WTRU ~1303

When Receiving Packets from Source WTRU, Select Target WTRU and Associated QoS Flow ~1304

Transmit Packets Received from Source WTRU to Target WTRU and Second QoS Flow ~1305

Fig. 13

Encapsulate Link Modification Request in IP Packets and Transmit to
Second WTRU                                                          1400

Receive from Second WTRU IP Encapsulated Link Modification Accept
Message                                                              1401

Transmit Packets to Second WTRU via WTRU-to-WTRU Relay              1402

METHODS AND APPARATUSES FOR END-TO-END QUALITY OF SERVICE FOR COMMUNICATION BETWEEN WIRELESS TRANSMIT-RECEIVE UNITS

CROSS REFERENCE TO RELATED APPLICATIONS

This application is a U.S. National Stage Application under 35 U.S.C. § 371 of International Patent Application No. PCT/US2021/025926, filed Apr. 6, 2021, which claims the benefit of U.S. Provisional Patent Application No. 63/007,472, filed Apr. 9, 2020, the contents of which are incorporated herein by reference as if fully set forth.

BACKGROUND

The Proximity Service (ProSe) for wireless networks allows Wireless Transmit-Receive Units (WTRUs) in proximity to discover and communicate with each other. By the Direct Communication establishment procedure, a communication path (PC5 Layer-2 link) is established between two WTRUs that are in direct communication range.

For direct WTRU peer-to-peer communications, PC5 Quality of Service (QoS) can be set up and managed between peers communicating via the PC5 link.

When a WTRU communicates with a peer WTRU via a ProSe layer 3 WTRU-to-WTRU relay, the WTRU can only establish PC5 links with the relay, which means that QoS cannot be supported from end-to-end (E2E), i.e., from WTRU to peer WTRU. Improvement of WTRU to WTRU communications via WTRU-to-WTRU relays is therefore desirable.

SUMMARY

Methods and apparatuses are described herein for end-to-end quality of service for communication between WTRUs.

First embodiments are described, and claimed in the appended claims, of a method for use in a wireless transmit-receive unit to wireless receive-transmit unit relay, WTRU-to-WTRU relay, and of a corresponding device.

Second embodiments are described and claimed in the appended claims, of a method for use in a wireless transmit-receive unit to wireless receive-transmit unit relay, WTRU-to-WTRU relay, and of a corresponding device.

Third embodiments are described and claimed in the appended claims, of a method for use in a wireless transmit-receive unit to wireless receive-transmit unit relay, WTRU-to-WTRU relay, and of a corresponding device.

Fourth embodiments are described, of a method for use in a first wireless transmit-receive unit, WTRU, and of a corresponding device.

Unless otherwise stated explicitly herein, a feature of one embodiment may be combined with another embodiment. Additionally, embodiments and/or features of embodiments may be combined or concatenated to achieve further advantageous results.

BRIEF DESCRIPTION OF THE DRAWINGS

A more detailed understanding may be had from the detailed description below, given by way of example in conjunction with drawings appended hereto. Figures in the description are examples. As such, the figures and the detailed description are not to be considered limiting, and other equally effective examples are possible and likely. Furthermore, like reference numerals in the figures indicate like elements, and wherein:

FIG. 13 is a flow chart of the embodiment illustrated in FIG. 9.

DETAILED DESCRIPTION

Example Networks for Implementation of the Embodiments

Figure 1A:
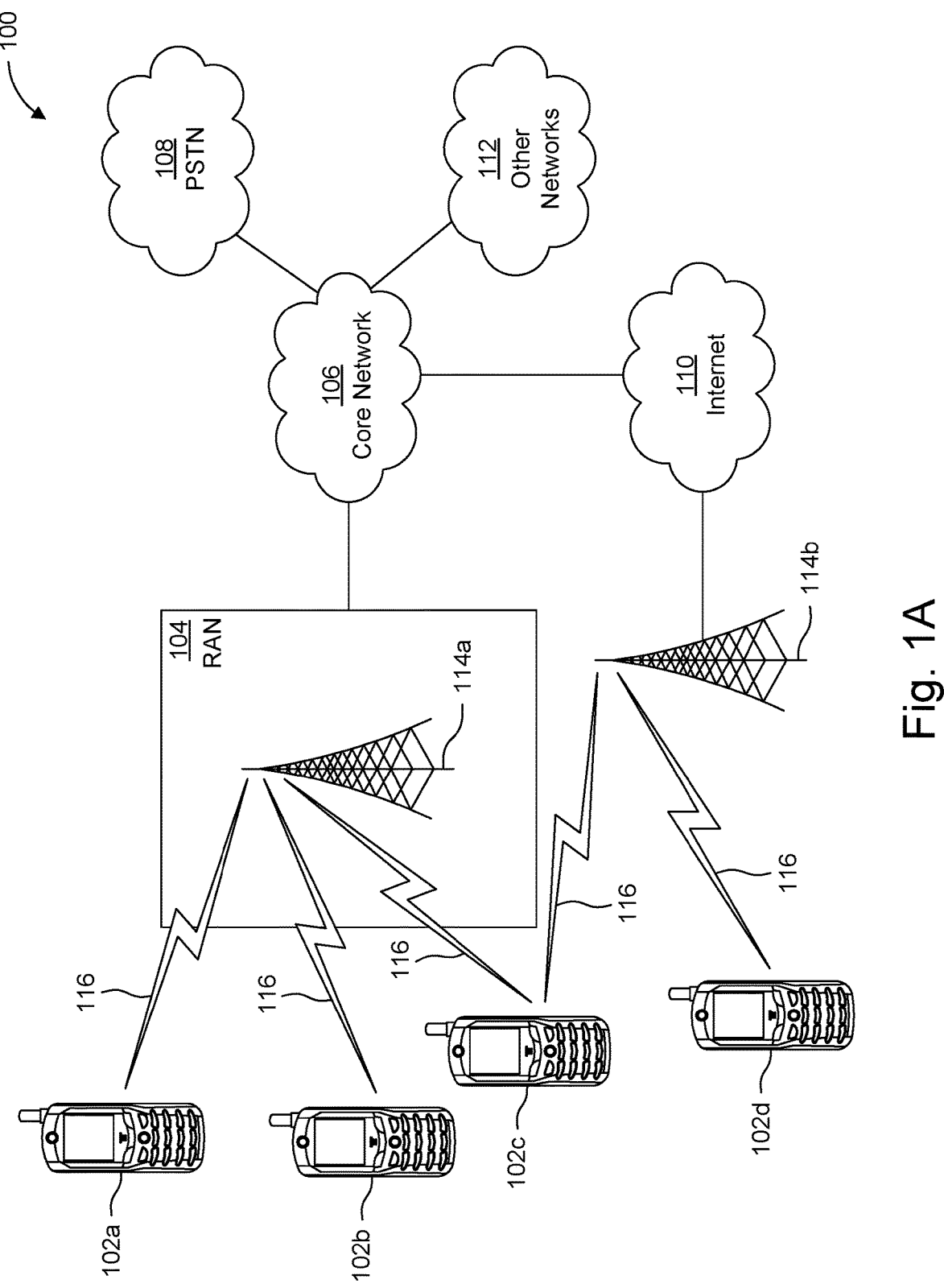
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
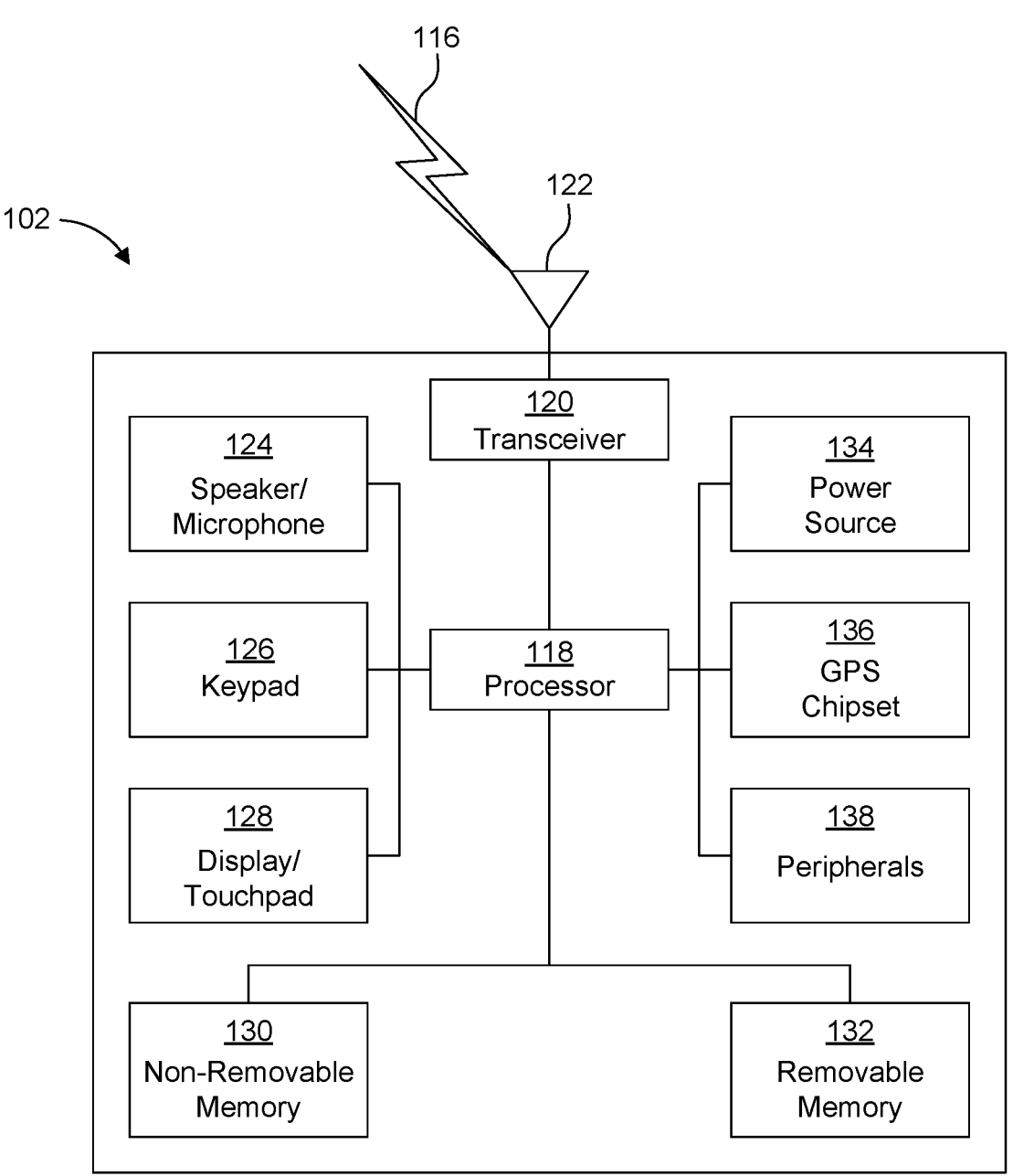
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
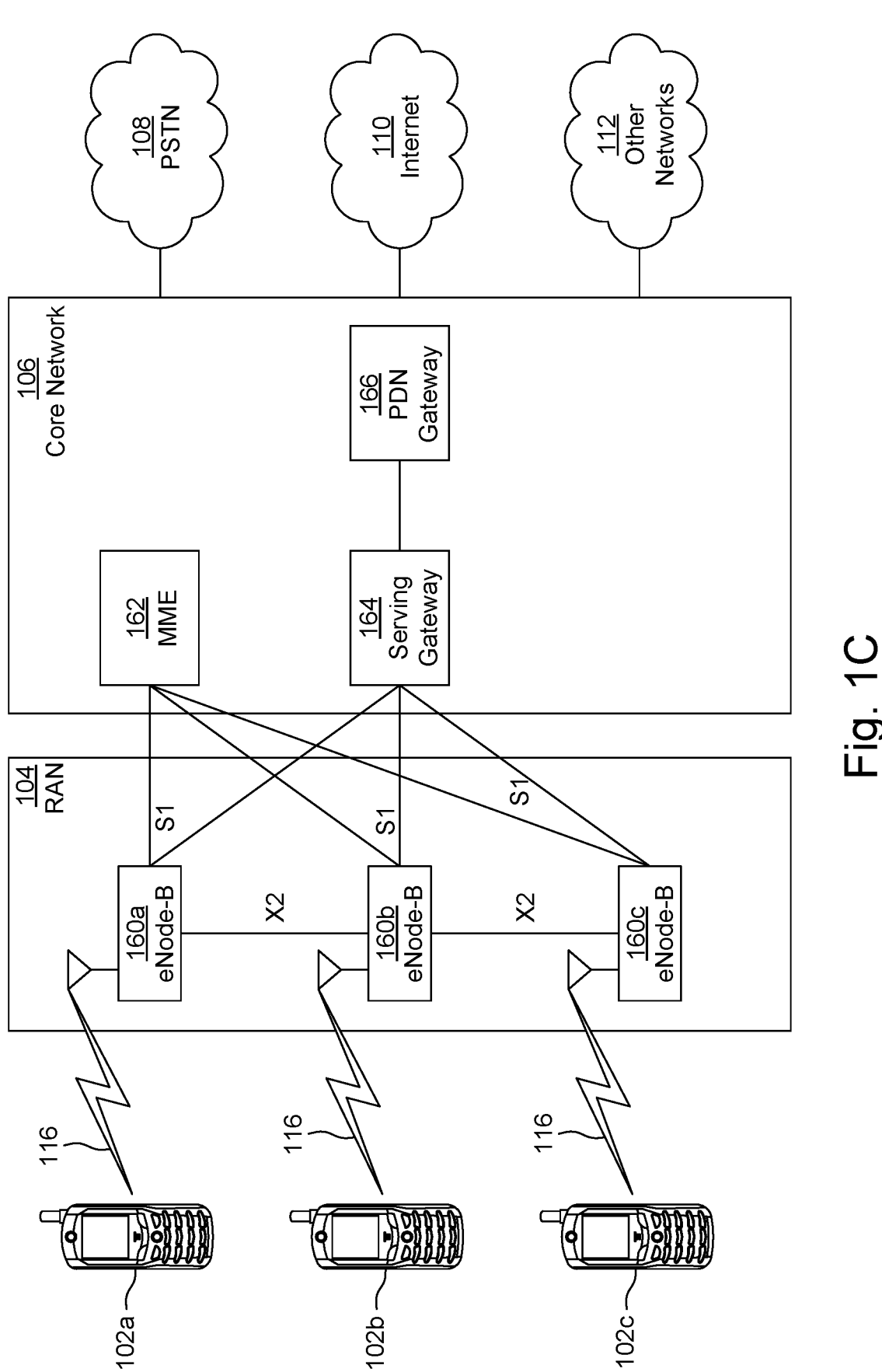
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Figure 10:
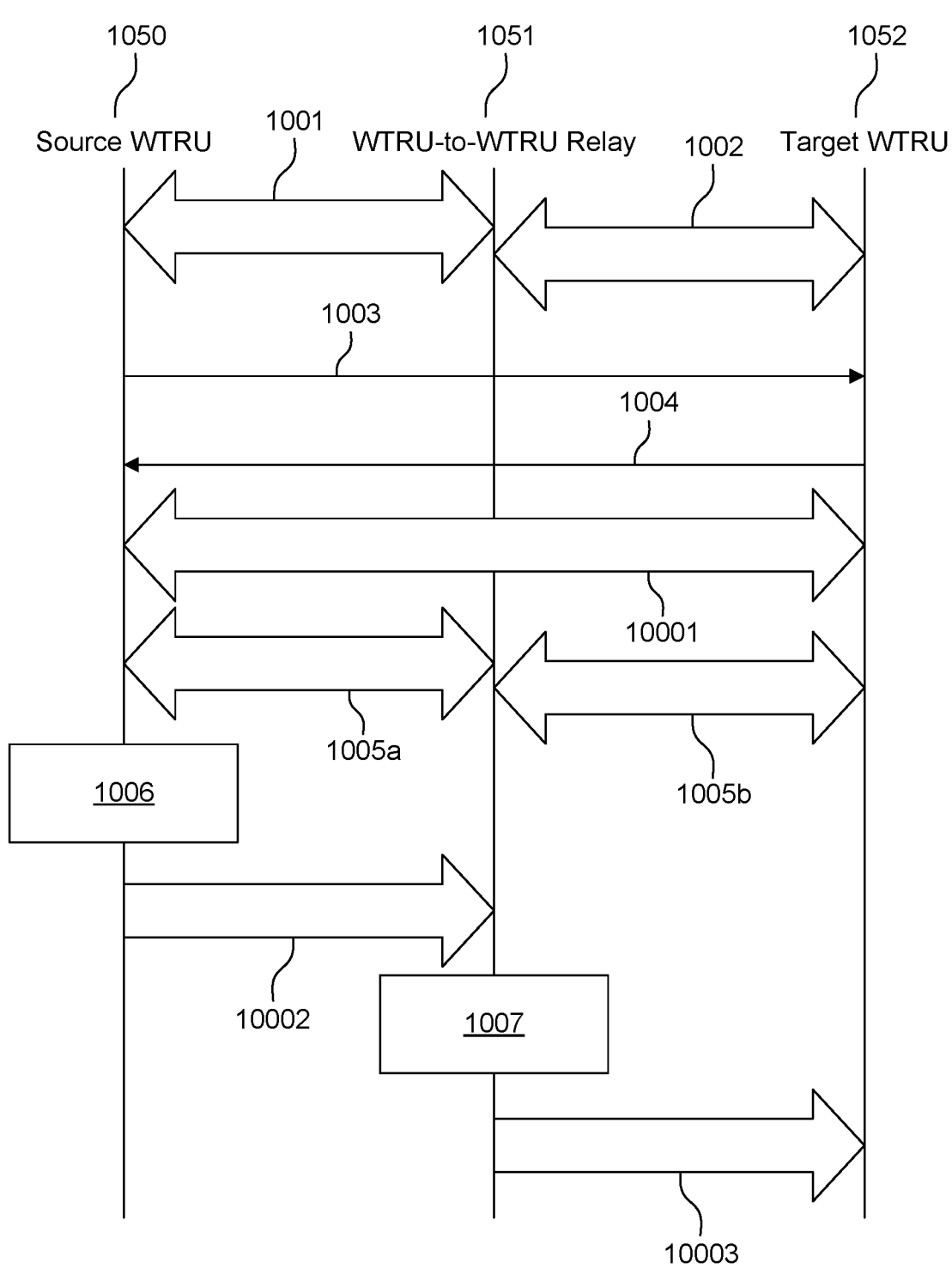
FIG. 10 is an embodiment where a source WTRU establishes an end-to-end QoS flow with a target WTRU and associates it to a PC5 QoS flow with ProSe WTRU-to-WTRU Relay.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
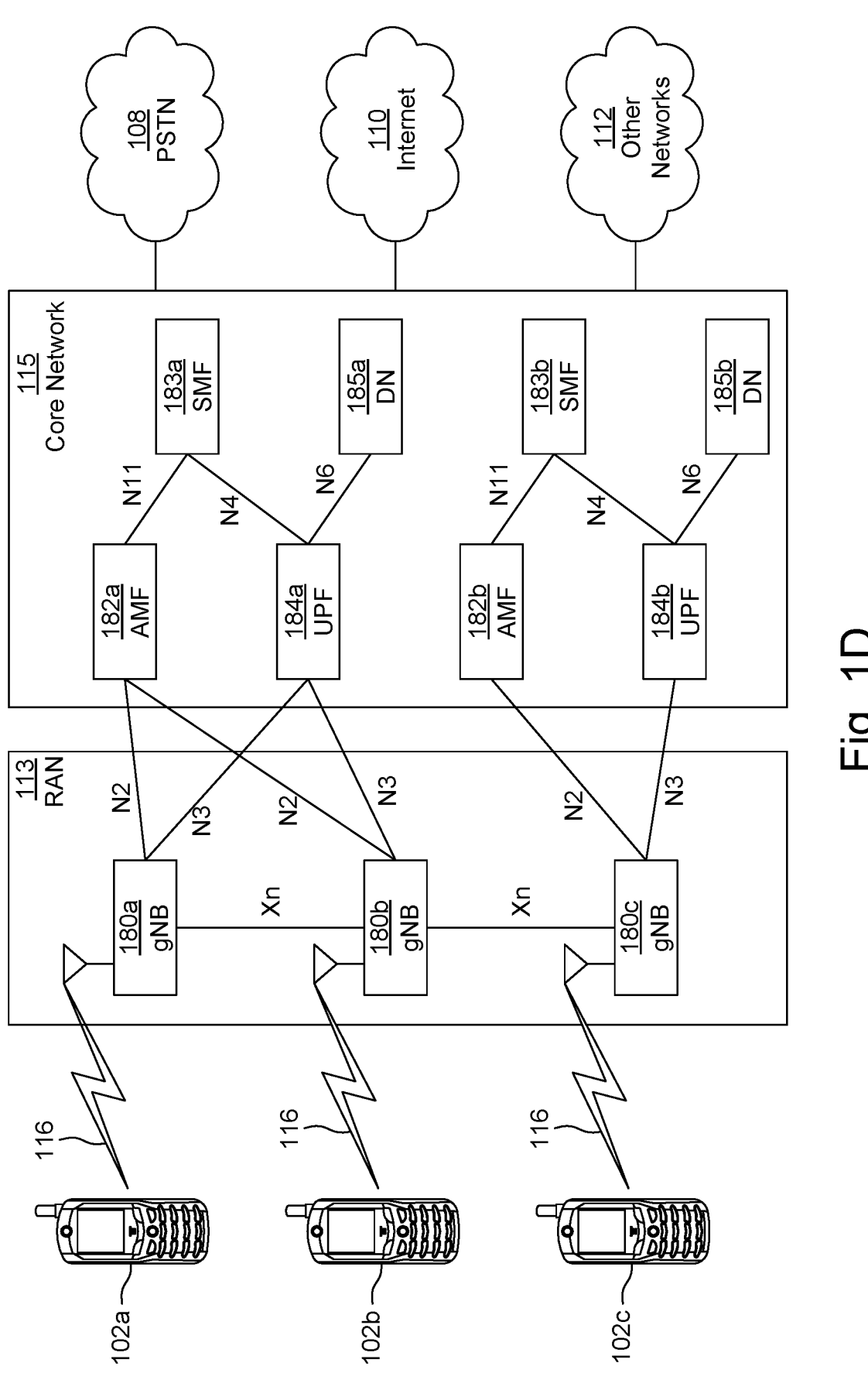
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Proximity Service (ProSe)

Proximity Service allows WTRUs in proximity to discover and communicate with each other. By Direct Communication establishment procedure, the communication path (PC5 Layer-2 link) is established between two WTRUs that are in direct communication range.

Figure 2:
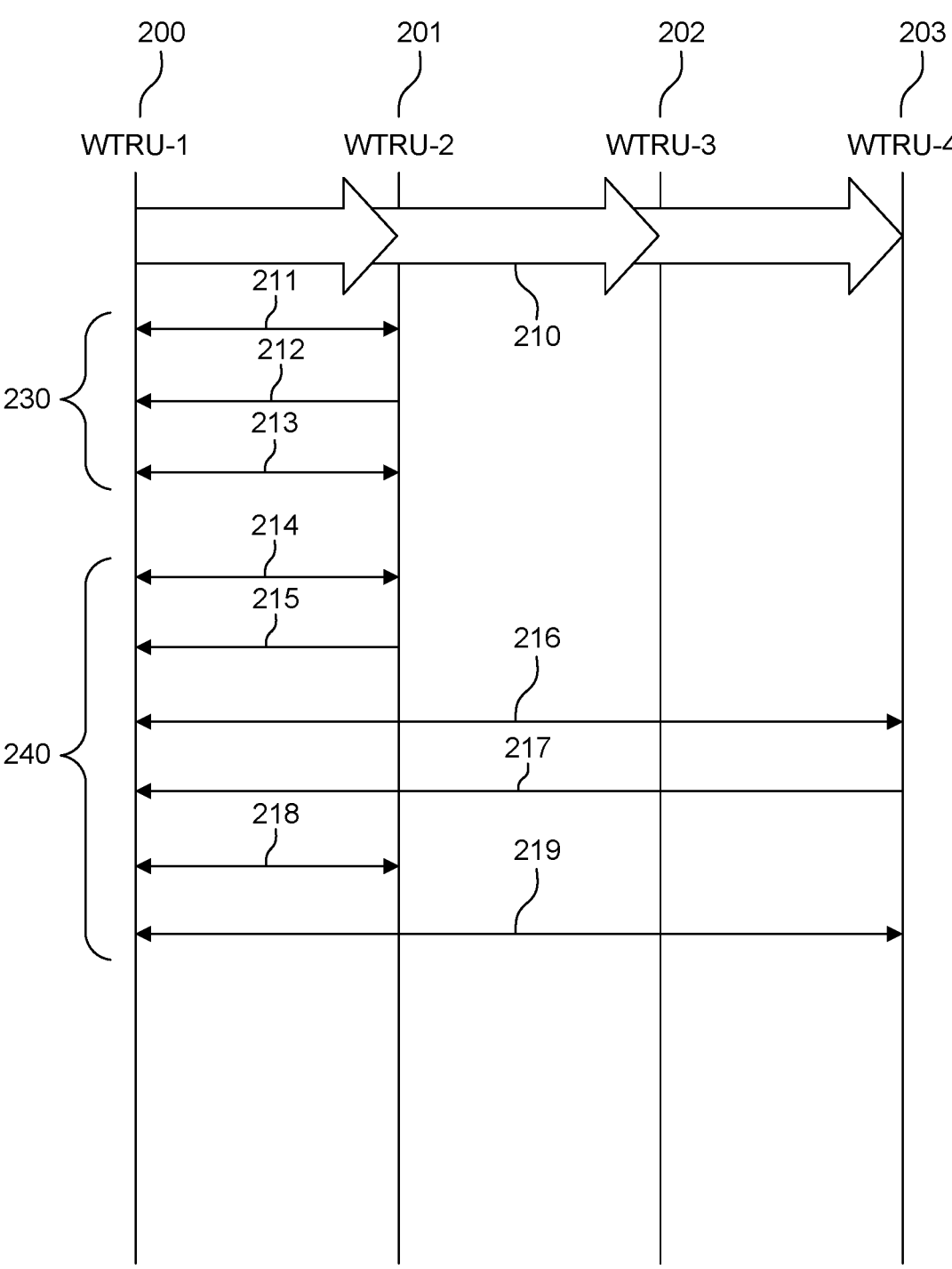
FIG. 2 is an example of a PC5 layer-2 establishment procedure.

PC5 Layer-2 link establishment procedure may be performed as shown in FIG. 2.

A. WTRU oriented (230): an initiating WTRU (WTRU-1, 200) broadcasts a Direct Communication Request (DCR) message 210 which may include the upper layer identifier of a peer WTRU and source Data Link Layer ("layer 2" or "L2") identifier (ID) of the initiating WTRU 200. A peer WTRU (e.g., WTRU-2, 201 in the figure, or WTRU-3, 202) may decide to reply to the request with a Direct Communication Accept (DCA) message 211 using its L2 ID as the source L2 ID and the initiating WTRU L2 ID as the destination L2 ID. Arrow 212 represents a Direct Communication Accept message (unicast). Arrow 213 represents ProSe service data over a unicast link.

B. ProSe service oriented (240): an initiating WTRU (WTRU-1, 200) broadcasts a DCR message 210 announcing the ProSe Service available for PC5 layer-2 link establishment. All WTRUs that are receiving this message and are interested in the announced ProSe service may reply with a DCA message to establish a communication. An interested peer WTRU (e.g., WTRU-2, 201 or WTRU-4, 203 in the figure) uses its L2 ID as the source L2 ID and the initiating WTRU L2 ID as the destination L2 ID. Arrows 214 and 216 represent security establishment. Arrows 215 and 217 represent a Direct Communication Accept message (unicast). Arrows 218 and 219 represent ProSe service data over a unicast link.

Figure 3:
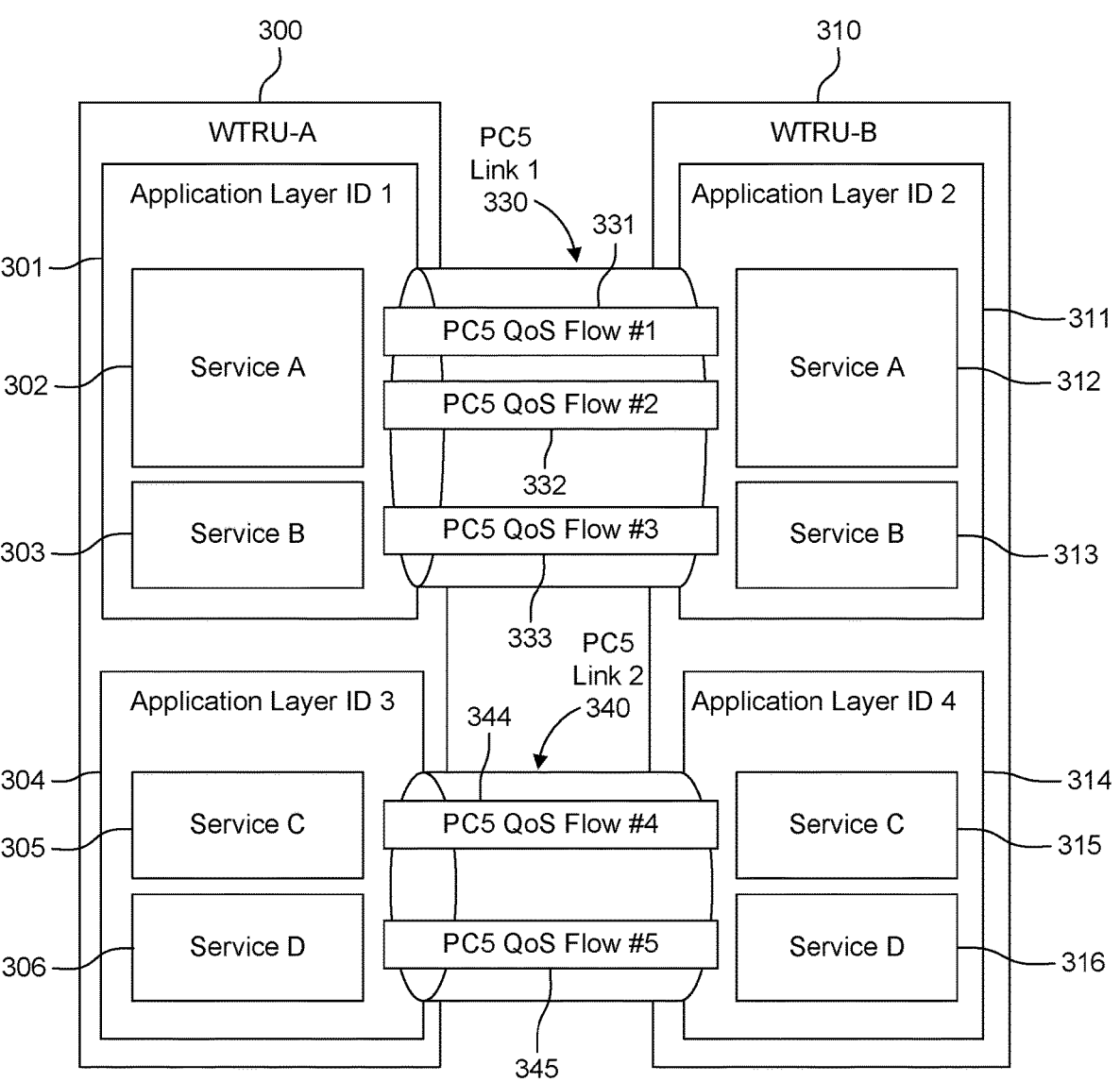
FIG. 3 is a PC5 flow introduced to PC5 for satisfying a QoS requirement.

In order to satisfy a QoS requirement of different services, a PC5 flow is introduced to PC5 as layer-2 link as in FIG. 3. Multiple PC5 QoS flows, e.g., #1-#5 (references 331-345 respectively) may be established for each PC5 link (i.e., PCT layer-2 link) for services between application layers. E.g., for operating services A (302, 312), B (303, 313), C (305, 315) and D (306, 316) between four application layers (301, 304, 311, 314) of two WTRUs (300, 310), a first PC5 link 1 (330) between Application Layer ID 1 (301) and Application Layer ID 2 (311) comprises three flows, namely flow #1 (331) and flow #2 (332) between Service A 302 and Service A 312 and flow #3 (333) between Service B 303 and Service B 313; a second PC5 link 2 (340) between Application Layer ID 3 (304) and Application Layer ID 4 (314) comprises two flows, namely flow #4 (344) between Service C 305 and Service C 315 and flow #5 (345) between Service D 306 and Service D 316. Each PC5 QoS flow 331-345 is associated with a PC5 QoS Rule (not shown) and the PC5 QoS parameters (not shown). The PC5 QoS Rule may contain a PC5 QoS Flow Identifier, a precedence value, a PC5 Packet Filter Set (e.g. an IP Packet Filter Set), that may be used to classify the packets to the correct PC5 QoS flow. The PC5 QoS parameters may include QoS Identifier, Flow Bit Rates, etc.

A PC5 QoS flow may be established during the PC5 link establishment procedure or modification procedure. For example, during the PC5 link establishment procedure, QoS flow parameters are included in a Direct Communication Accept message 211.

ProSe WTRU-to-WTRU Relay

Figure 4:
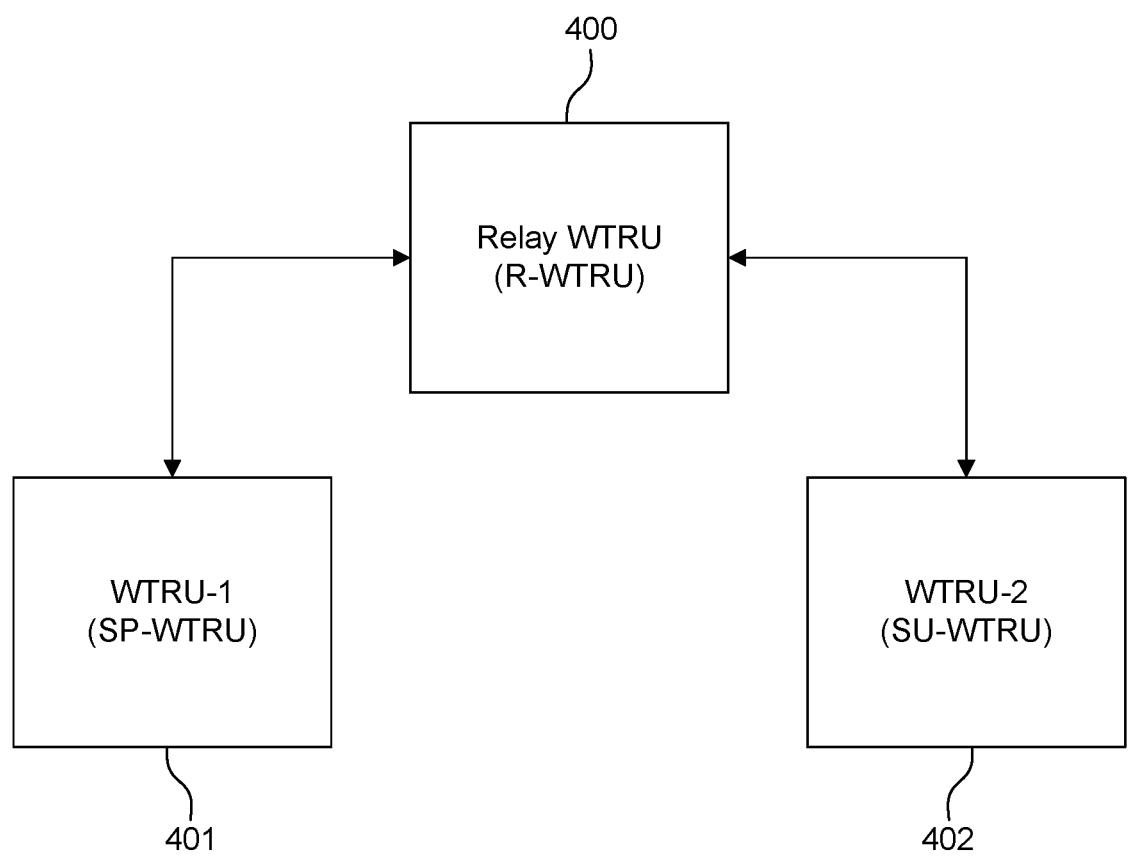
FIG. 4 is an example WTRU to WTRU communication via a relay WTRU (or 'WTRU-to-WTRU Relay').

ProSe or proximity services are also being studied as part of the 5G Network in Rel-17 [TR 23.752]. A new scenario is being introduced for 5G ProSe for WTRU to WTRU communication via the relay WTRU. In such a scenario, the WTRU would discover and then subsequently communicate with another WTRU ('peer WTRU') via the relay WTRU in between. This scenario is depicted in FIG. 4.

The figure illustrates a WTRU to WTRU communication via a relay WTRU. It shows the following three types of WTRUs:

Service Provider WTRU (WTRU-1 (SP-WTRU), 401): this type of WTRU is offering a certain service which other WTRUs are looking for. Examples of such services may be: Restaurant, Taxi Service, Gaming Console, Gaming Controller, etc.

Service Utilizing WTRU (WTRU-2 (SU-WTRU), 402): this type of WTRU may look for the services offered by the Service Provider WTRU (401). There may be more than one Service Utilizing WTRUs which may try to discover services provided by a particular Service Provider WTRU. Examples of Service Utilizer WTRU may be: Restaurant customer, taxi passenger, Gaming controller, AR/VR headset, etc.

Relay WTRU (R-WTRU 400): the Relay WTRU may assist/relay both the discovery messages and PC5 data communication between other WTRUs (here, between Service Provider WTRU 401 and Service Utilizing WTRU 402).

ProSe Layer-3 WTRU-to-WTRU Relay

Figure 5:
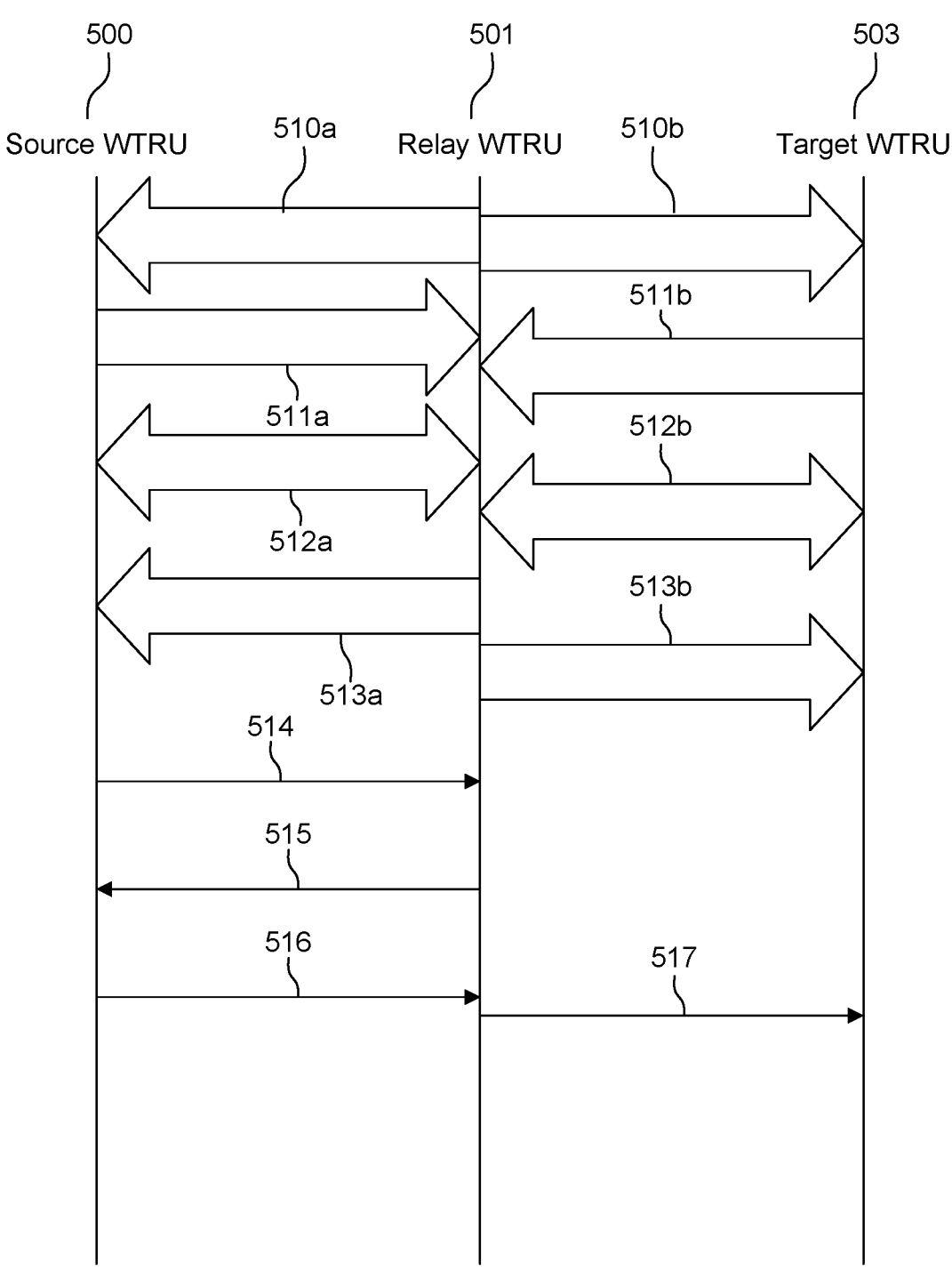
FIG. 5 is a ProSe Layer-3 WTRU-to-WTRU Relay based communication between WTRUs.

A ProSe Layer-3 WTRU-to-WTRU Relay provides a WTRU-to-WTRU Relay function as described in subclause 2.1 of the 5G Network in Rel-17 [TR 23.752] by using an IP routing mechanism. In this solution, any WTRU that wants to communicate with other WTRUs via a ProSe 5G layer-3 WTRU-to-WTRU Relay needs to establish a PC5 link with the WTRU-to-WTRU Relay. The ProSe Layer-3 WTRU-to-WTRU Relay allocates IP address/prefix to WTRUs and stores the association of User Info of the WTRU and the IP address/prefix. The procedure is depicted in FIG. 5.

A source WTRU 500 and a target WTRU 503 include a configuration for using a WTRU-to-WTRU Relay. Entity 501 is configured to act as a WTRU-to-WTRU Relay. The WTRU-to-WTRU Relay 501 announces its WTRU-to-WTRU Relay capability in 510a (received by source WTRU 500) and 510b (received by target WTRU 503). In 511a and 511b source WTRU 500 respectively target WTRU 503 transmit Direct Communication Requests to WTRU-to-WTRU Relay 501. In 512a and 512b source WTRU 500 and target WTRU 503 proceed with security establishment. In 513a and 513b WTRU-to-WTRU Relay 501 transmits Direct Communication Accepts (per Unicast) to source WTRU 500 respectively target WTRU 503.

Now, when source WTRU 500 needs to communicate with target WTRU 503 or needs to discover a ProSe service, it sends a DNS query 514 for the target WTRU 503 (based on Target User Info) or for the ProSe Service to the ProSe Layer-3 WTRU-to-WTRU Relay 501 over the PC5 link, which will return in 515 the IP address/prefix of the target WTRU or the ProSe Service. The source WTRU then sends in 516 IP data or non-IP data encapsulated in IP to the target WTRU via the PC5 link to WTRU-to-WTRU Relay 501 that returned the IP address/prefix of the target WTRU. The ProSe Layer-3 WTRU-to-WTRU Relay 501 acts as an IP router, and forwards 517 packets received from source WTRU 500 in 516 to the corresponding PC5 link towards the target WTRU 503.

End-to-End QoS Control with ProSe Layer-3 WTRU-to-WTRU Relay

According to the QoS mechanism described in subclause 2.1 of the 5G Network in Rel-17 [TR 23.752], when a WTRU communicates with a peer WTRU directly, PC5 QoS flows are established between WTRUs in the PC5 link between the peer WTRUs. However, when a first WTRU communicates with a second (peer) WTRU via a ProSe Layer-3 WTRU-to-WTRU Relay, the first WTRU can only establish PC5 links and PC5 QoS flows towards the ProSe Layer-3 WTRU-to-WTRU Relay. This means that full end-to-end, i.e., first WTRU to second (peer) WTRU, QoS is not supported according to the mechanism described above. Consequently, embodiments described here address at least the following issues:

How to forward packets from a source WTRU to a target WTRU using QoS flows across a ProSe Layer-3 WTRU-to-WTRU Relay;

How to ensure that end-to-end QoS is maintained between two WTRUs communicating via a ProSe Layer-3 WTRU-to-WTRU Relay.

Packet Forwarding between QoS Flows

Figure 6:
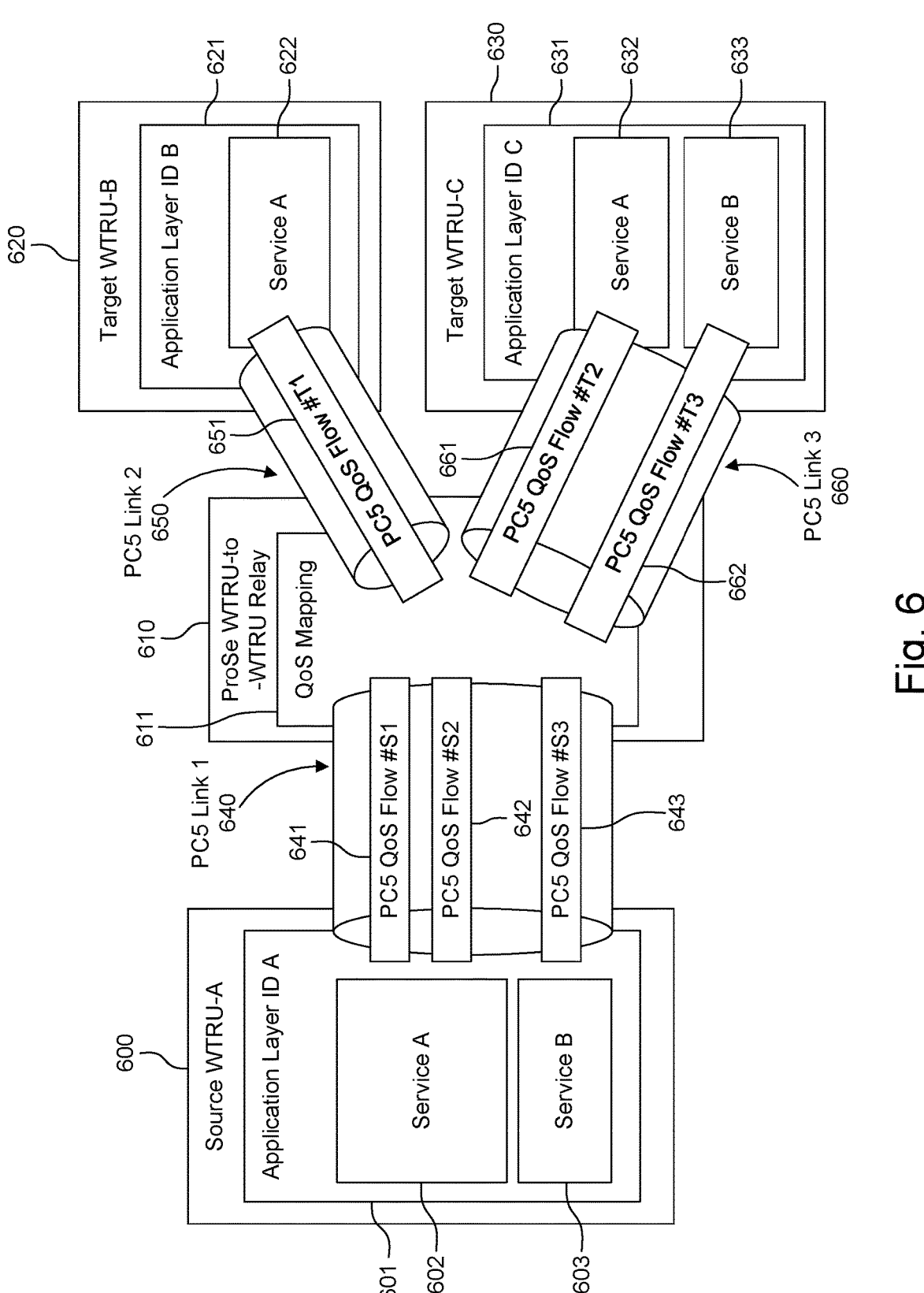
FIG. 6 is an embodiment illustrating PC5 flow mapping performed by a WTRU-to-WTRU Relay.

Embodiments described here address at least the above listed issues. In these embodiments, PC5 QoS flows are established respectively between a Source WTRU and ProSe WTRU-to-WTRU Relay, and between the ProSe WTRU-to-WTRU Relay and a Target WTRU. The ProSe WTRU-to-WTRU Relay performs PC5 QoS flows mapping between each side (source and target WTRUs), an embodiment is shown in FIG. 6.

According to an embodiment, when a source WTRU (600) with an Application Layer ID A 601, Service A 602 and Service B 603, establishes a PC5 QoS Flow (#Sx) (one of 641, 642, 643) with ProSe WTRU-to-WTRU relay 610, the source WTRU 600 indicates an ID of a target WTRU (one of WTRU-B 620, WTRU-C 630; WTRU-B 620 having Application Layer ID B 621 and Service A 622, and WTRU-C 630 having Application Layer ID C 631 and Service A 632 and Service B 633), for which the PC5 QoS Flow (#Sx) (one of 641, 642, 643) is used to communicate. Then, the ProSe WTRU-to-WTRU Relay 610 establishes a PC5 QoS flow (#Tx) (one of 651, 661, 662) with the target WTRU (one of 620, 630), and the ProSe WTRU-to-WTRU Relay 610 stores a QoS mapping information 611 between the PC5 QoS Flow (#Sx) (one of 641, 642, 643) (source WTRU 600 <-> ProSe WTRU-to-WTRU Relay 610) and the corresponding PC5 QoS flow (#Tx) (one of 651, 661, 662) (ProSe WTRU-to-WTRU Relay 610 <-> target WTRU (one of 620, 630)).

For example, when the ProSe WTRU-to-WTRU Relay 610 receives packets from PC5 QoS flow (#S1, 641) over PC5 link 1 (640), the ProSe WTRU-to-WTRU Relay 610 forwards the packets to PC5 QoS flow (#T1, 651) over PC5 link 2 (650). For example, when the ProSe WTRU-to- WTRU relay 610 receives packets from PC5 QoS flow (#S2, 642), the ProSe WTRU-to-WTRU Relay 610 forwards the packets to PC5 QoS flow (#T2, 661) over PC5 link 3 (660), and when the ProSe WTRU-to-WTRU relay 610 receives packets from PC5 QoS flow (#S3, 643), the ProSe WTRU-to-WTRU Relay 610 forwards the packets to PC5 QoS flow (#T3, 662) over PC5 link 3 (660).

According to an embodiment, when a PC5 QoS Flow (#Sx) (e.g., one of 641, 642, 643) with a source WTRU (e.g., 600) is established, the ProSe WTRU-to-WTRU Relay 610 may establish a new PC5 QoS flow (e.g., one of 651, 661, 662) with the target WTRU (e.g., 620 or 630) or modify an existing PC5 QoS flow (e.g., one of 651, 661, 662) with a target WTRU (e.g., one of 620 or 630).

According to an embodiment, the decision whether to create a new PC5 QoS flow or to modify/reuse an existing one, may be based on QoS parameters, e.g., PQI (PC5 QoS identifier, which is associated to specific delay, packet loss rate, etc.). The WTRU-to-WTRU relay may decide to modify an existing QoS flow with a target WTRU if the PQI or any other QoS parameter or any combination of QoS parameters of one existing QoS flow with the target WTRU is the same, equivalent, inferior, or superior as/to or comply with the PQI of the QoS flow requested by source WTRU. Otherwise, the WTRU-to-WTRU relay may decide to create a new QoS flow. While the terms modification/creation relate here to modification of QoS mapping information (e.g., in a table or other data structure in the WTRU-to-WTRU relay), both modification and creation of an QoS flow may result in transmission of a Link Modification request message by the WTRU-to-WTRU relay; in the case of creation of a new QoS flow, the Link Modification request may include a new QoS flow ID, while in the case of modification of an existing QoS flow, the Link Modification request may include a QoS flow ID of an existing QoS flow.

According to an embodiment, when a ProSe WTRU-to-WTRU Relay (e.g., 610) modifies an existing PC5 QoS flow (e.g., one of flows 651, 661, 662 with a target WTRU e.g., 620 or 630), for example using a Link Modification Procedure or a similar PC5 signaling procedure, the ProSe WTRU-to-WTRU Relay (e.g., 610) may modify the existing mapping information (e.g., in 611) associated to PC5 QoS flow with that target WTRU.

According to an embodiment, if a PC5 QoS flow (e.g., one of 651, 661 or 662) with a target WTRU (e.g., 620 or 630) is deleted, e.g., due to QoS flow release or failed modification procedure, a ProSe WTRU-to-WTRU Relay (e.g., 610) may delete the mapping information (e.g., 611) associated to PC5 QoS flow with that target WTRU.

According to an embodiment, a ProSe WTRU-to-WTRU Relay (e.g., 610) may decide the QoS parameters of a PC5 QoS flow (e.g., one of 651, 661, 662) with a target WTRU (e.g., one of 620 or 630) based on QoS parameters of a corresponding PC5 QoS flow (e.g., one of 641, 642, 643) with a source WTRU (e.g., 600). The corresponding PC5 QoS flow with the source WTRU may be obtained from the mapping information (e.g., 611).

According to an embodiment, a target WTRU's ID may be the target WTRU's IP address, Application Layer User ID (e.g., Application Layer ID 'B' for target WTRU-B 620, Application Layer ID 'C' for target WTRU 630), etc.

According to an embodiment, a PC5 QoS flow mapping (e.g., 611) stored in the ProSe WTRU-to-WTRU Relay (e.g., 610) stores mapping information related to mapping between source PC5 flows (Sx) and target PC5 QoS Flows (Tx) and vice versa, for example between PC5 QoS flow #S1 (641) and PC5 QoS flow #T1 (651) and vice versa.

According to an embodiment, WTRU-to-WTRU relay behavior may be as follows:

The WTRU-to-WTRU relay receives a PC5 QoS flow establishment request (#S1) from the source WTRU, which includes the target WTRU's ID;

The WTRU-to-WTRU relay sends a PC5 QoS flow establishment request or PC5 QoS flow modification request (#T1) towards the target WTRU based on the received target WTRU's ID; the QoS parameters in the PC5 QoS flow establishment request (#T1) may be decided by the WTRU-to-WTRU relay based on the QoS parameters in the PC5 QoS flow establishment request (#S1); The request may include the source WTRU's ID.

For a MODIFY case (modification of an existing QoS flow), the WTRU-to-WTRU relay may verify if the existing flow may be modified with the new QoS flow. If the existing flow may be modified, the WTRU-to-WTRU relay sends a PC5 QoS flow modification request (#T1) to the target WTRU based on the received target WTRU's ID;

Otherwise (non-MODIFY case), the WTRU-to-WTRU relay sends a PC5 QoS flow establishment request (#T1) towards the target WTRU based on received target WTRU's ID;

If PC5 QoS flow establishment or PC5 QoS flow modification is successful, the WTRU-to-WTRU relay stores the mapping between the PC5 QoS flow (#S1) with the source WTRU and the corresponding PC5 QoS flow (#T1) with the target WTRU;

Based on the mapping information (QoS flow mapping), the WTRU-to-WTRU relay performs packet forwarding between the PC5 QoS flow (#S1) with the source WTRU and the PC5 QoS flow (#T1) with the corresponding target WTRU, e.g. when receiving a packet from PC5 QoS flow (#S1), determines, based on the mapping information, the corresponding PC5 QoS flow (#T1) to use towards a target WTRU and forwards the packet to the corresponding target WTRU via PC5 QoS flow (#T1), and Based on the mapping information (QoS flow mapping), the WTRU-to-WTRU relay performs vice versa packet forwarding for packets received from the target WTRU and destined to the source WTRU: the WTRU-to-WTRU relay performs packet forwarding between PC5 QoS flow (#T1) with the target WTRU and the PC5 QoS flow (#S1) with the corresponding source WTRU, e.g. when receiving a packet from PC5 QoS flow (#T1), the WTRU-to-WTRU relay determines, based on the mapping information, the corresponding PC5 QoS flow (#S1) to use towards a source WTRU and forwards the packet to the corresponding source WTRU via PC5 QoS flow (#S1).

According to an embodiment, the source WTRU behavior may be as follows:

The source WTRU receives a trigger to establish a PC5 QoS flow from its application layer;

The source WTRU sends a PC5 QoS flow establishment request to the ProSe WTRU-to-WTRU relay, which includes the target WTRU's ID.

Figure 7:
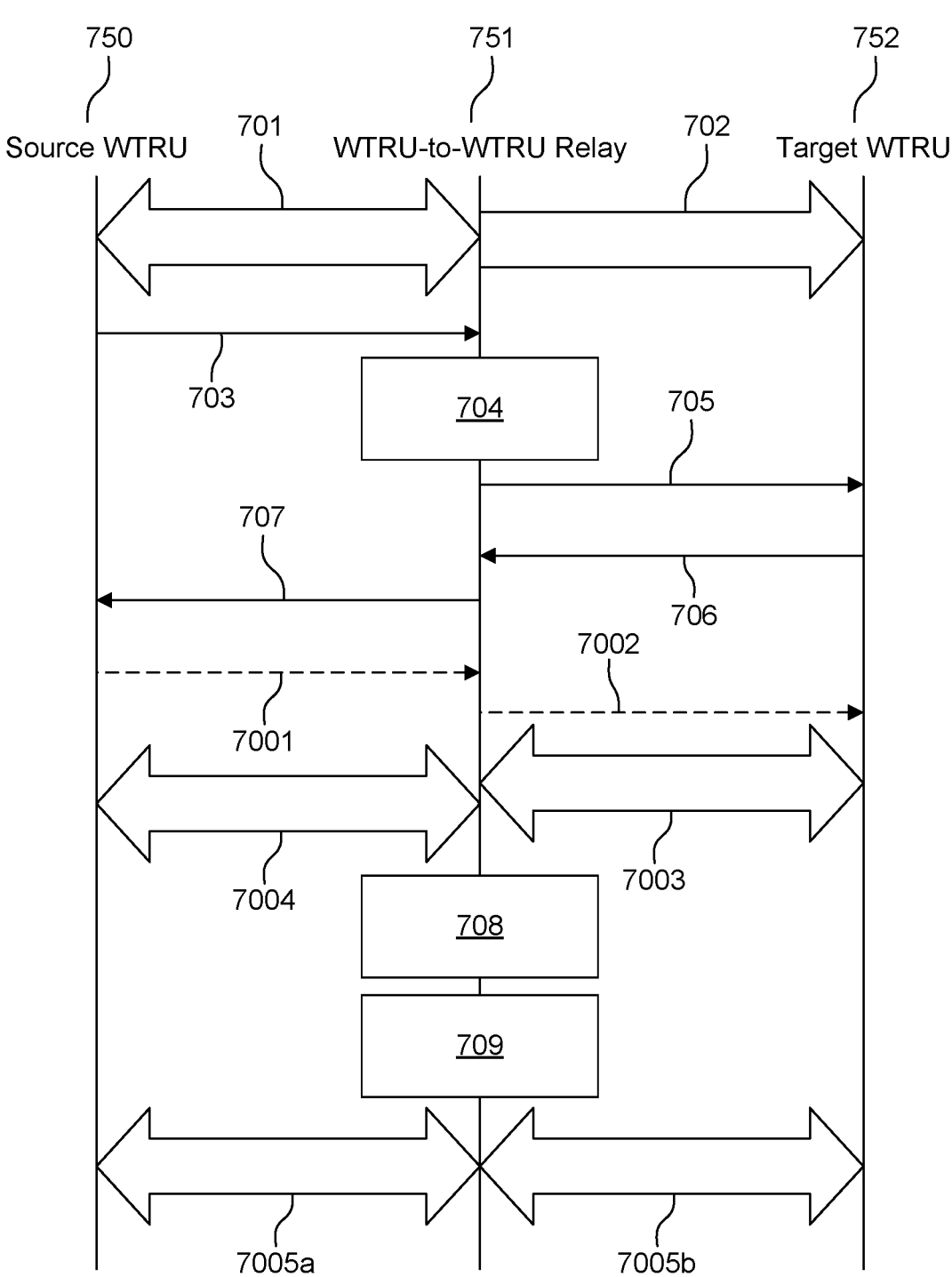
FIG. 7 is an embodiment where a ProSe WTRU-to-WTRU relay establishes PC5 QoS flow with a target WTRU when the PC5 QoS flow with a source WTRU is established. The ProSe WTRU-to-WTRU relay forwards packets based on the mapping between PC5 QoS flows.

A corresponding example procedure is as illustrated in FIG. 7:

(701) A PC5 link is established between a source WTRU 750 and a ProSe layer-3 WTRU-to-WTRU relay 751;

(702) A PC5 link is established between the target WTRU 752 and the ProSe layer-3 WTRU-to-WTRU relay 751;

(703) The source WTRU 750 sends a Link modification request to establish a PC5 QoS flow, in which request the source WTRU 750 indicates the QoS flow parameters and target WTRU 752 ID (e.g. ProSe WTRU ID, user info, application layer ID or IP address) of this PC5 QoS flow.

(704) The ProSe WTRU-to-WTRU relay 751 decides to establish or modify a PC5 QoS flow towards the target WTRU 752;

(705) The ProSe WTRU-to-WTRU relay 751 decides whether to establish a new QoS flow with target WTRU 752 either to modify an existing QoS flow with target WTRU 752 or to reuse existing QoS flow with target WTRU 752 without modification. According to an embodiment, the decision whether to create a new PC5 QoS flow or to modify/reuse an existing one, may be based on QoS parameters, e.g., PQI (PC5 QoS identifier, which is associated to specific delay, packet loss rate, etc.). The WTRU-to-WTRU relay may decide to modify an existing QoS flow with a target WTRU if the PQI or any other QoS parameter or any combination of QoS parameters of one existing QoS flow with the target WTRU is the same, equivalent, inferior, or superior as/to or comply with the PQI of the QoS flow requested by source WTRU. Otherwise, the WTRU-to-WTRU relay may decide to create a new QoS flow. While the terms modification/creation relate here to modification of QoS mapping information (e.g., stored in a table or other data structure in the WTRU-to-WTRU relay), both modification and creation of an QoS flow may result in transmission, by , the ProSe WTRU-to-WTRU relay 751 of a Link modification request to the target WTRU 752, in which the ProSe WTRU-to-WTRU relay 751 indicates the QoS flow parameters and optionally source WTRU ID (e.g. ProSe WTRU ID, user info, application layer ID or IP address) of this PC5 QoS flow;

(706) The target WTRU 752 sends a Link modification accept to the ProSe WTRU-to-WTRU relay 751 to indicate that the PC5 QoS flow is established successfully; After 706, the QoS flow #T1 is established.

(707) The ProSe WTRU-to-WTRU relay 751 sends a Link modification accept to the source WTRU 750 to indicate the PC5 QoS flow is established successfully; Optionally (7001), a Link Modification Complete message may be sent from Source WTRU 750 to ProSe WTRU-to-WTRU relay 751 and (7002) from WTRU-to-WTRU Relay 751 to Target WTRU 752. After 707, the QoS flow #S1 is established (7003, 7004), and the source WRTU 750 can send packets to the target WTRU 752 in this QoS flow.

a) (707) After receiving the Link Modification Complete message, the target WTRU 752 can send packets to source WTRU 750 in this QoS flow.

(708) The ProSe WTRU-to-WTRU relay 751 stores the PC5 QoS flow mapping information between the PC5 QoS flow with source WTRU 750 (QoS flow #S1) and PC5 QoS flow with target WTRU 752 (QoS flow #T1); for example, a table of each QoS Flow Identifier of QoS flow with source WTRU 750 and associated QoS Flow Identifier of QoS flow with target WTRU 752.

(709) The ProSe WTRU-to-WTRU relay 751 forwards packets between the PC5 QoS flows based on PC5 QoS flow mapping. Arrows 7005 represent packets in QoS flows, with 7005a between source WTRU 750 and WTRU-to-WTRU relay 751, and 7005b between WTRU-to-WTRU relay 751 and target WTRU 752.

According to another embodiment, when receiving a data packet from a source WTRU, a ProSe WTRU-to-WTRU Relay retrieves the target WTRU ID from the packet and retrieves QoS parameters from the PC5 QoS flow in which the packet is delivered (i.e., between source WTRU and WTRU-to-WTRU Relay); The ProSe WTRU-to-WTRU Relay determines whether to establish or modify a PC5 QoS flow with target WTRU based on retrieved QoS parameters; the ProSe WTRU-to-WTRU Relay forwards the packets to the established or modified PC5 QoS flow with the target WTRU.

Figure 8:
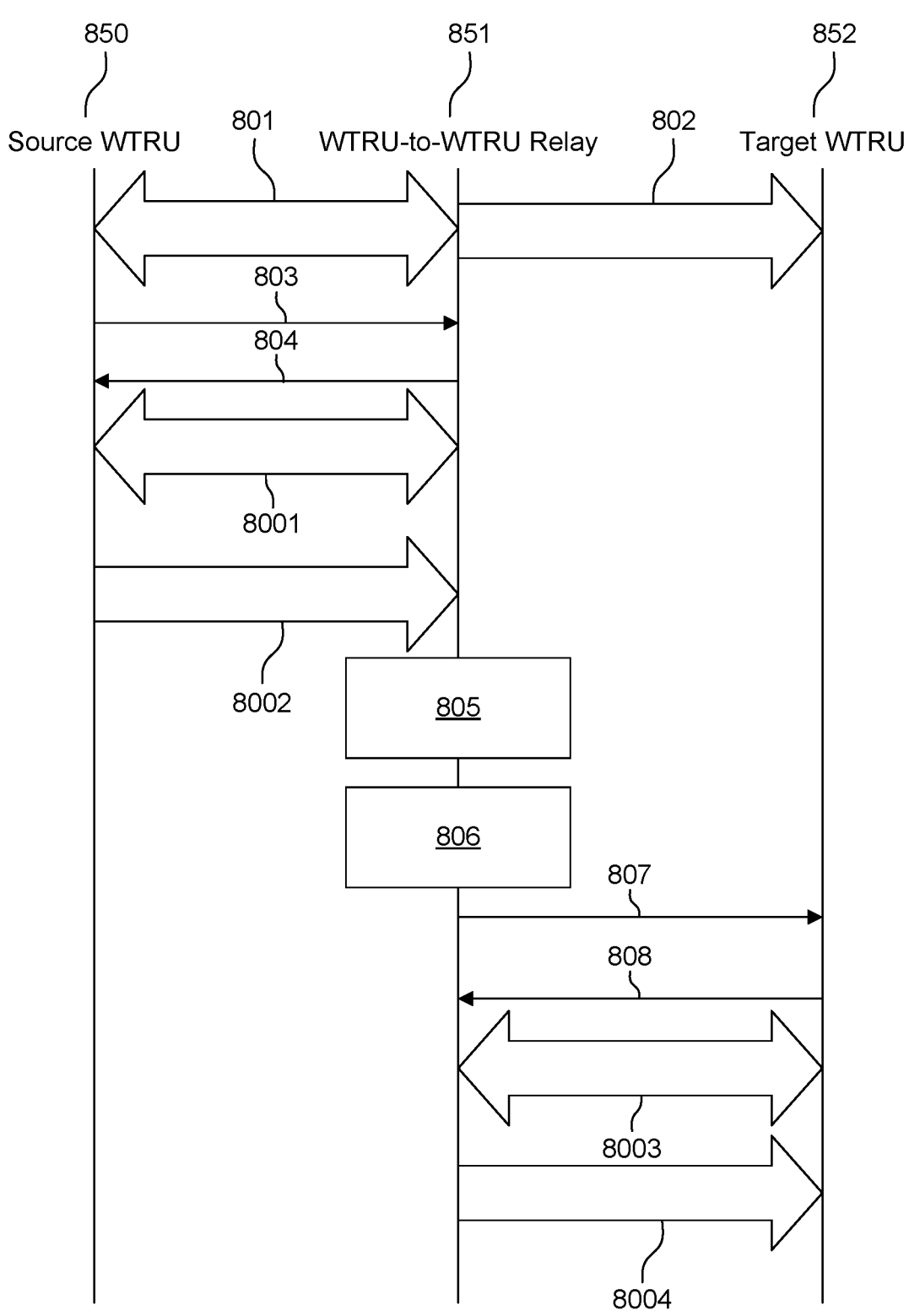
FIG. 8 is an embodiment where a ProSe WTRU-to-WTRU relay establishes PC5 QoS flow with target WTRU when receiving packets from the source WTRU; the ProSe WTRU-to-WTRU relay forwards packets based on the mapping between PC5 QoS flows.

According to an embodiment, the WTRU-to-WTRU relay behavior may be as follows:

the WTRU-to-WTRU relay receives packet from a source WTRU in a PC5 QoS flow (#S1);

the WTRU-to-WTRU relay retrieves the target WTRU ID from the packet; and retrieves the QoS parameters from the PC5 QoS flow (#S1);

the WTRU-to-WTRU relay sends a PC5 QoS flow establishment request or PC5 QoS flow modification request (#T1) towards the target WTRU based on retrieved target WTRU's ID and the QoS parameters; The request may include the source WTRU's ID.

the WTRU-to-WTRU relay forwards the received packet to the target WTRU via PC5 QoS flow (#T1);

A corresponding example procedure is as illustrated in FIG. 8:

(801) A PC5 link is established between a source WTRU 850 and a ProSe layer-3 WTRU-to-WTRU relay 851;

(802) A PC5 link is established between a target WTRU 852 and the ProSe layer-3 WTRU-to-WTRU relay 851;

(803) The source WTRU 850 sends a Link modification request to establish PC5 QoS flow, the link modification request including QoS flow parameters;

(804) The ProSe WTRU-to-WTRU relay 851 indicates that the PC5 QoS flow is established successfully through transmission of a Link modification accept. A QoS flow #S1 is now established 8001 and packets may be received 8002 using the PC5 QoS flow.

(805) When receiving a packet from the source WTRU 850, the ProSe WTRU-to-WTRU relay 851 retrieves the target WTRU ID from the packet and retrieves the QoS parameters from the PC5 QoS flow context;

(806) The ProSe WTRU-to-WTRU relay 851 decides to establish or modify a PC5 QoS flow towards the target WTRU 852 based on the retrieved target WTRU ID and QoS parameters;

(807) The ProSe WTRU-to-WTRU relay 851 sends a Link modification request to the target WTRU 852, in which the ProSe WTRU-to-WTRU relay 851 indicates the QoS flow parameters and optionally source WTRU ID of this PC5 QoS flow, to let the target WTRU 852 know that packets to source WTRU 850 shall be put into this QoS flow;

(808) The target WTRU 852 sends a Link modification accept to the ProSe WTRU-to-WTRU relay 851 to indicate the PC5 QoS flow is established successfully, 8003;

The ProSe WTRU-to-WTRU relay forwards, 8004, based on the QoS flow mapping, packets to target WTRU via PC5 QoS flow; and Vice versa, and after 808, the ProSe WTRU-to-WTRU relay, based on the QoS flow mapping, may forward packets to source WTRU via PC5 QoS flow (not shown).

According to another embodiment, during the PC5 QoS flow establishment procedure, a source WTRU and a target WTRU provide an IP filter for the PC5 QoS flow; based on the IP filter of each PC5 QoS flow, a ProSe WTRU-to-WTRU relay decides the PC5 QoS flow which is to be used for forwarding a received packet.

According to an embodiment, source and target WTRUs may negotiate IP filter information at the application layer level.

According to an embodiment, a WTRU-to-WTRU relay behavior may be as follows:

The WTRU-to-WTRU relay receives PC5 QoS flow establishment request with an IP filter, e.g. source/target IP address/prefix and/or source/target port; which indicates the IP packets can be delivered in this PC5 QoS flow;

The WTRU-to-WTRU relay stores the IP filter of each PC5 QoS flow;

The WTRU-to-WTRU relay, when receiving a packet, determines QoS flow for packet forwarding based on IP filter.

Figure 9:
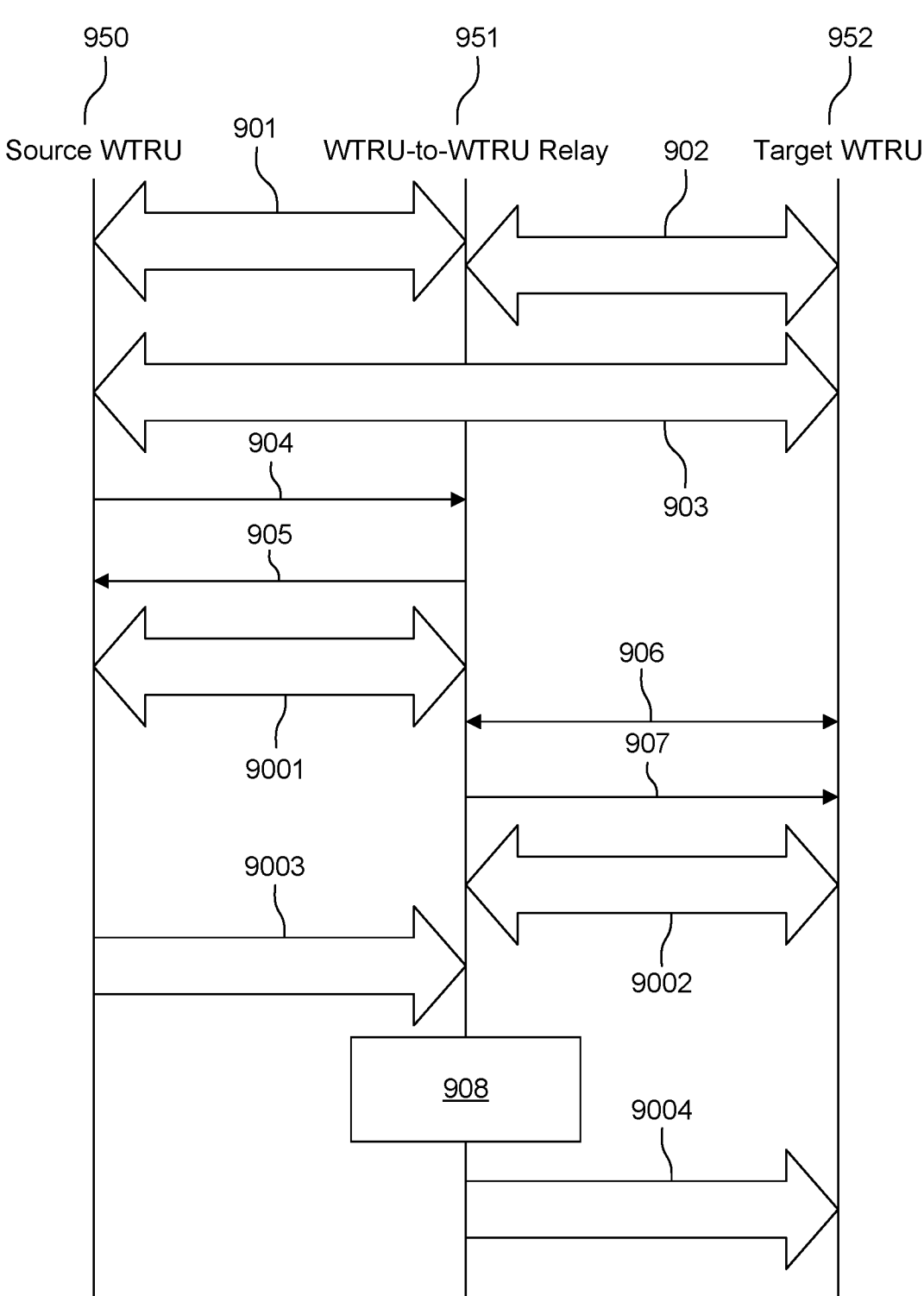
FIG. 9 is an embodiment where a source WTRU and target WTRU establishes a PC5 QoS flow with a ProSe WTRU-to-WTRU relay respectively; the ProSe WTRU-to-WTRU relay forwards packets based on IP filter of each PC5 QoS flow.

According to an embodiment, the source/target WTRU behavior may be as follows:

the source/target WTRU negotiates IP filter information with peer WTRU at application layer;

the source/target WTRU includes the IP filter information in the PC5 QoS flow establishment request;

A corresponding example procedure is as illustrated in FIG. 9:

(901) A PC5 link is established between a source WTRU 950 and a ProSe layer-3 WTRU-to-WTRU relay 951;

(902) A PC5 link is established between a target WTRU 952 and the ProSe layer-3 WTRU-to-WTRU relay 951;

(903) The source WTRU 950 and target WTRU 952 may determine the IP filter of QoS flow to use based on QoS negotiation. Application layer signaling or User Plane may be used to negotiate the QoS between the source WTRU 950 and the target WTRU 952.

(904) The source WTRU 950 sends a Link modification request to establish a PC5 QoS flow, in which the negotiated IP filter is included.

(905) The ProSe WTRU-to-WTRU relay 951 sends a Link modification accept 905 to the source WTRU 950 to indicate that the PC5 QoS flow is established successfully, 9001;

(906) The Target WTRU 952 sends a Link modification request 906 to establish a PC5 QoS flow, in which the negotiated IP filter is included.

(907) The ProSe WTRU-to-WTRU relay 951 sends a Link modification accept 907 to the target WTRU 952 to indicate that the PC5 QoS flow is established successfully, 9002;

(908) When receiving, 9003, a packet from the source WTRU 950, the ProSe WTRU-to-WTRU relay 951 determines 908 the QoS flow to be used (to be selected) for the packet based on IP filter; it then forwards, 9004, the packet to the target WTRU 952 on the thus determined (the thus selected) QoS flow; and Vice versa, (not shown), when receiving a packet from the target WTRU 952 the ProSe WTRU-to-WTRU relay 951 determines 908 the QoS flow to be used (to be selected) for the packet based on IP filter; it then forwards the packet to the source WTRU 950 on the thus determined (the thus selected) QoS flow.

End-to-End QoS Flow

According to an embodiment, an end-to-end PC5 QoS flow is established between a source WTRU and a target WTRU.

According to an embodiment, the source WTRU encapsulates a PC5 QoS flow establishment message into IP packet and sends it to the target WTRU, in which QoS parameters are included; also the source WTRU may perform mapping from the E2E QoS flow to PC5 QoS flow with the ProSe WTRU-to-WTRU Relay.

According to an embodiment, the source WTRU behavior may be as follows:

the source WTRU generates an end-to-end QoS flow establishment request, which includes QoS parameters; the source WTRU encapsulates the end-to-end QoS flow establishment request into (an) IP packet(s), with the target WTRU's IP address as target address;

When the end-to-end QoS flow is established successfully, the source WTRU establishes a PC5 QoS flow with the ProSe WTRU-to-WTRU Relay;

the source WTRU performs mapping between end-to-end QoS flow with the target WTRU and PC5 QoS flow with the ProSe WTRU-to- WTRU relay.

A corresponding example procedure is as illustrated in FIG. 10:

(1001) A PC5 link is established between a source WTRU 1050 and a ProSe layer-3 WTRU-to-WTRU relay 1051;

(1002) A PC5 link is established between a target WTRU 1052 and the ProSe layer-3 WTRU-to-WTRU relay;

(1003) The source WTRU 1050 encapsulates the PC5-S Link Modification Request into IP packet(s) and sends it to the target WTRU 1052;

(1004) The target WTRU 1052 sends a PC5-S Link Modification Accept 1004 to the source WTRU 1050 to indicate the End-to-End QoS flow is established successfully; After 1004, an End-to-End QoS flow is established, 10001.

(1005) The source WTRU 1050 and the target WTRU 1052 establish PC5 QoS flows with the ProSe WTRU-to-WTRU relay 1051 respectively as steps 904-907 in FIG. 9;

(1006) The source WTRU 1050 performs a mapping from end-to-end QoS flow with target WTRU 1052 to PC5 QoS flow with the ProSe WTRU-to-WTRU relay 1051 based on QoS parameters;

(1007) When receiving a packet, 10002, from the source WTRU 1050, the ProSe WTRU-to-WTRU relay 1051 may use the embodiment as shown in FIG. 9, 908 to perform packet forwarding, 10003; and Vice versa (not shown), when receiving a packet from the target WTRU 1052, the ProSe WTRU-to-WTRU relay 1051 may use the embodiment shown in FIG. 9, 908 to perform packet forwarding to the source WTRU 1050.

Figure 11:
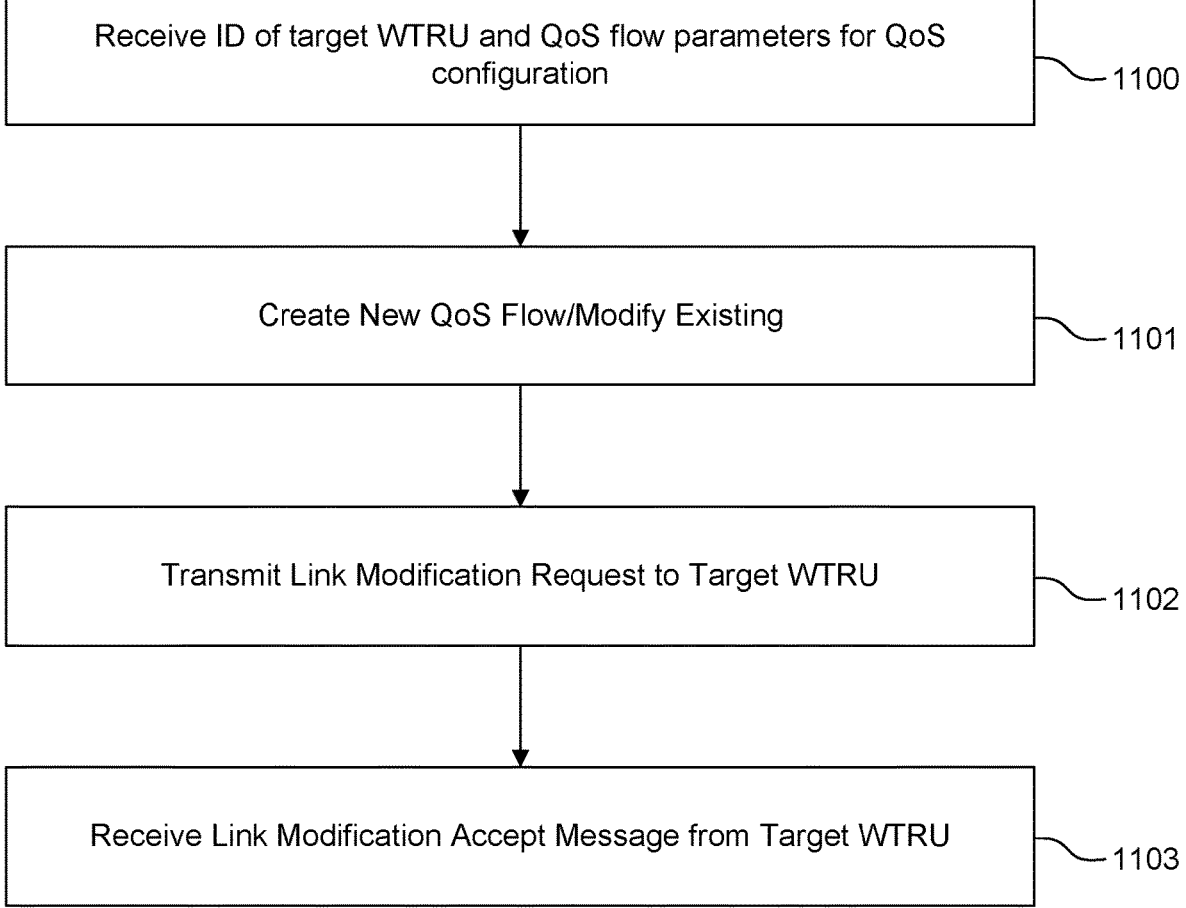
FIG. 11 is a flow chart of the embodiment illustrated in FIG. 7.

FIG. 11 is a flow chart of the embodiment illustrated in FIG. 7, related to a method for use in a wireless transmit-receive unit to wireless receive-transmit unit relay ('WTRU-to-WTRU relay'). The method comprises: receiving (1100) an identifier of a target WTRU, and Quality of Service, QoS, flow parameters for QoS configuration of a first link between the source WTRU and the WTRU-to-WTRU relay; determining (1101), by the WTRU-to-WTRU relay, and based on the QoS flow parameters, to create a new QoS flow or to modify an existing QoS flow with the target WTRU; transmitting (1102) a link modification request to the target WTRU identified by the identifier, for modifying a second link between the WTRU-to-WTRU relay and the target WTRU identified by the identifier, the link modification request indicating the QoS flow parameters; receiving (1103), from the target WTRU identified by the identifier, a link modification accept message indicating to the WTRUto-WTRU relay that the second link has been modified according to the QoS flow parameters; and transmitting (1104), to the source WTRU, a link modification accept message indicating that the first link modification has been accepted by the WTRU-to-WTRU.

According to an embodiment of the method for use in a WTRU-to-WTRU relay, the identifier of the target WTRU is comprised in a data packet received from the source WTRU and wherein the QoS flow parameters for QoS configuration of the first link is retrieved from a QoS profile of the QoS flow.

According to an embodiment of the method for use in a WTRU-to-WTRU relay, the identifier of the target WTRU, and the QoS flow parameters for QoS configuration of the first link are comprised in a first link modification request received from the source WTRU, for modifying the first link between the source WTRU and the WTRU-to-WTRU relay, and wherein the method further comprises transmitting, to the source WTRU, a first link modification accept message indicating that the first link modification has been accepted by the WTRU-to-WTRU relay.

According to an embodiment of the method for use in a WTRU-to-WTRU relay, the method further comprises storing a mapping of QoS flows between the source WTRU and the target WTRU, and forwarding packets received from the source WTRU to the target WTRU based on the stored mapping of QoS flows.

According to an embodiment of the method for use in a WTRU-to-WTRU relay, the determining comprises modifying the existing QoS flow with the target WTRU under the condition that flow parameters of the existing QoS flow comply with the flow parameters for configuration of the first link, and creating a new QoS flow with the target WTRU otherwise.

According to an embodiment of the method for use in a WTRU-to-WTRU relay, the second link modification request comprises, in the case of modifying an existing QoS flow, a QoS flow identifier of the existing QoS flow, and in the case of creating a new QoS flow, a new QoS flow identifier.

According to an embodiment of the method for use in a WTRU-to-WTRU relay, the identifier of the target WTRU is at least one of:

an IP address of the target WTRU;

an application layer user identifier.

According to an embodiment, a wireless receive-transmit unit to wireless receive-transmit unit relay, WRTU-to-WTRU relay, is disclosed. The WTRU-to-WTRU relay comprises at least one processor, a memory, and a transceiver. The at least one processor is configured to:

receive an identifier of a target WTRU, and Quality of Service, QoS, flow parameters for QoS configuration of a first link between a source WTRU and the WTRU-to-WTRU relay;

determine, based on the QoS flow parameters, to create a new QoS flow or to modify an existing QoS flow with the target WTRU;

transmit a second link modification request to the target WTRU, for modification of a second link between the WTRU-to-WTRU relay and the target WTRU, the second link modification request indicating the QoS flow parameters; and receive, from the target WTRU, a link modification accept message indicating to the WTRU-to-WTRU relay that the second link has been modified according to the QoS flow parameters.

According to an embodiment of the WTRU-to-WTRU relay, the at least one processor is configured to retrieve the identifier of the target WTRU from a data packet received from the source WTRU and wherein the at least one processor is configured to retrieve the QoS flow parameters for QoS configuration of a first link from a QoS profile of the QoS flow.

According to an embodiment of the WTRU-to-WTRU relay, the identifier of the target WTRU, and the QoS flow parameters for QoS configuration of the first link are comprised in a first link modification request received from the source WTRU, for modifying a first link between the source WTRU and the WTRU-to-WTRU relay, and wherein the at least one processor is further configured to transmit, to the source WTRU, a first link modification accept message indicating that the first link modification has been accepted by the WTRU-to-WTRU relay.

According to an embodiment of the WTRU-to-WTRU relay, the at least one processor is further configured to store a mapping of QoS flows between the source WTRU and the target WTRU in the memory, and to forward packets received from the source WTRU to the target WTRU based on the stored mapping of QoS flows.

According to an embodiment of the WTRU-to-WTRU relay, the at least one processor is further configured to modify an existing QoS flow with the target WTRU under the condition that flow parameters of the existing QoS flow comply with the flow parameters for configuration of the first link, and to create a new QoS flow with the target WTRU otherwise.

Figure 12:
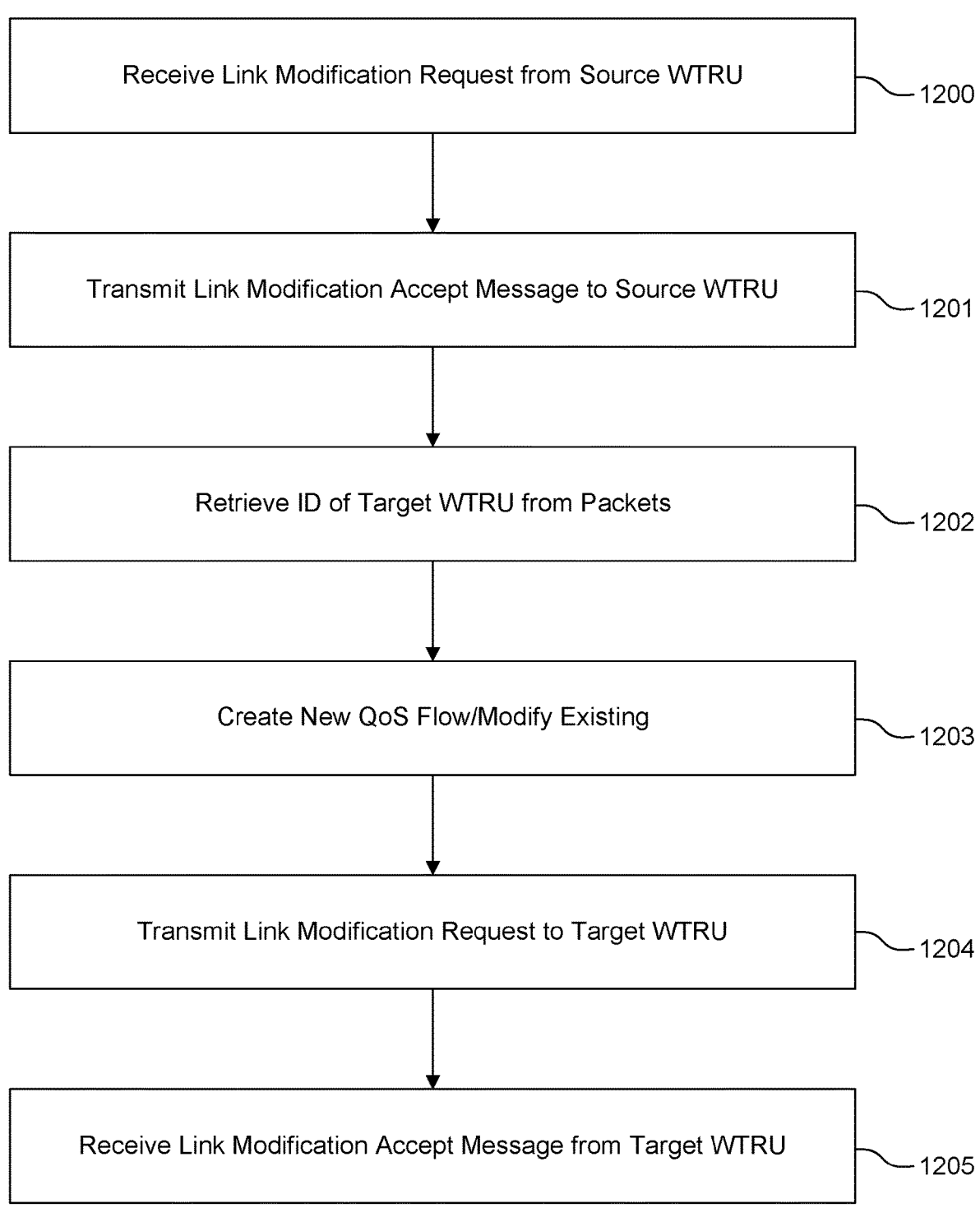
FIG. 12 is a flow chart of the embodiment illustrated in FIG. 8.

FIG. 12 is a flow chart of the embodiment illustrated in FIG. 8, related to a method for use in a wireless transmit-receive unit to wireless receive-transmit unit relay ('WTRU-to-WTRU relay'). The method comprises: receiving (1200) a link modification request from a source WTRU for modifying a first link between the source WTRU and the WTRU-to-WTRU relay, the link modification request comprising Quality of Service, QoS, flow parameters for QoS configuration of the first link; transmitting (1201), to the source WTRU, a link modification accept message indicating that the first link modification has been accepted by the WTRU-to-WTRU relay; retrieving (1202) an identifier of a target WTRU from packets of a QoS flow over the first link; determining (1203), based on the QoS flow parameters, to create a new QoS flow between the WTRU-to-WTRU relay and the target WTRU, or to modify an existing QoS flow between the WTRU-to-WTRU relay and the target WTRU; transmitting (1204) a link modification request to the target WTRU identified by the identifier, for modification of a second link between the WTRU-to-WTRU relay and the target WTRU, the link modification request indicating the QoS flow parameters; and receiving (1205), from the target WTRU, a link modification accept message indicating to the WTRU-to-WTRU relay that the second link has been modified according to the QoS flow parameters.

According to an embodiment of the WTRU-to-WTRU relay, the determining comprises modifying an existing QoS flow with the target WTRU under the condition that flow parameters of the existing QoS flow comply with the flow parameters for configuration of the first link, and creating a new QoS flow with the target WTRU otherwise.

According to an embodiment of the WTRU-to-WTRU relay, the link modification request comprises, in the case of modifying an existing QoS flow, a QoS flow identifier of the existing QoS flow, and in the case of creating a new QoS flow, a new QoS flow identifier.

According to an embodiment of the WTRU-to-WTRU relay, the identifier of the target WTRU is at least one of:
    an IP address;
    an application layer user identifier.

According to an embodiment, a wireless receive-transmit unit device to wireless receive-transmit unit relay, WRTU-to-WTRU relay, comprises at least one processor, a memory, and a transceiver. The at least one processor is configured to:
    receive a link modification request from a source WTRU for modification of a first link between said source WTRU and said WTRU-to-WTRU relay, the link modification request comprising Quality of Service, QoS, flow parameters for QoS configuration of said first link;
    transmit, to said source WTRU, a link modification accept message indicating that said first link modification has been accepted by said WTRU-to-WTRU relay;
    retrieve an identifier of a target WTRU from packets of a QoS flow over said first link;
    determine, based on said QoS flow parameters, to create a new QoS flow between said WTRU-to-WTRU relay and said target WTRU, or to modify an existing QoS flow between said WTRU-to-WTRU relay and said target WTRU;
    transmit a link modification request, for modification of a second link between said WTRU-to-WTRU relay and said target WTRU, said link modification request indicating said QoS flow parameters;
    receive, from said target WTRU, a link modification accept message indicating to said WTRU-to-WTRU relay that said second link has been modified according to said QoS flow parameters.

According to an embodiment of the WTRU-to-WTRU relay, the at least one processor is further configured to modify an existing QoS flow with the target WTRU under the condition that flow parameters of the existing QoS flow comply with the flow parameters for configuration of the first link, and to create a new QoS flow with the target WTRU otherwise.

FIG. 13 is a flow chart of the embodiment illustrated in FIG. 9, and relates to a method for use in a wireless transmit-receive unit to wireless receive-transmit unit relay ('WTRU-to-WTRU relay'). The method comprises: receiving (1300) a first link modification request from a source WTRU for modifying a first link between the source WTRU and the WTRU-to-WTRU relay, the first link modification request comprising Quality of Service, QoS, flow parameters for QoS configuration of the first link; transmitting (1301), to the source WTRU, a first link modification accept message indicating that the first link modification has been accepted by the WTRU-to-WTRU relay; receiving (1302) a second link modification request message from a target WTRU for modifying a second link between the target WTRU and the WTRU-to-WTRU relay, the second link modification request comprising Quality of Service, QoS, flow parameters for QoS configuration of the second link; transmitting (1303), to the target WTRU, a second link modification accept message indicating that the second link modification has been accepted by the WTRU-to-WTRU relay; and (1304) when receiving packets from the source WTRU via the first link using the QoS flow associated with the first link, selecting the second link and transmitting (1305) the packets to the target WTRU using the QoS flow associated with the second link (between the WTRU-to-WTRU relay and the target WTRU. And vice versa: when receiving packets from the target WTRU via the second link using the QoS flow associated with the second link (not shown), selecting the first link and transmitting the packets to the source WTRU using the QoS flow associated with the first link (between the WTRU-to-WTRU relay and the target WTRU).

According to an embodiment of the method for use in a WTRU-to-WTRU relay, the selecting is based on IP filter information negotiated between the source WTRU and the target WTRU.

According to an embodiment, a WTRU-to-WTRU relay is disclosed. The WTRU-to-WTRU relay comprises at least one processor, a memory, and a transceiver. The at least one processor is configured to:

receive a first link modification request from a source WTRU for modifying a first link between the source WTRU and the WTRU-to-WTRU relay, the link modification request comprising Quality of Service, QoS, flow parameters for QoS configuration of the first link;

transmit, to the source WTRU, a first link modification accept message indicating that the first link modification has been accepted by the WTRU-to-WTRU relay;

receive a second link modification request message from a target WTRU for modifying a second link between the target WTRU and the WTRU-to-WTRU relay, the second link modification request comprising Quality of Service, QoS, flow parameters for QoS configuration of the second link;

transmit, to the target WTRU, a second link modification accept message indicating that the second link modification has been accepted by the WTRU-to-WTRU relay; and when receiving packets from the source WTRU via the first link using the QoS flow associated with the first link, to select the second link and transmitting the packets to the target WTRU using the QoS flow associated with the second link.

According to an embodiment of the WTRU-to-WTRU relay, the at least one processor is further configured to select the second link based on IP filter information negotiated between the source WTRU and the target WTRU.

Figure 14:
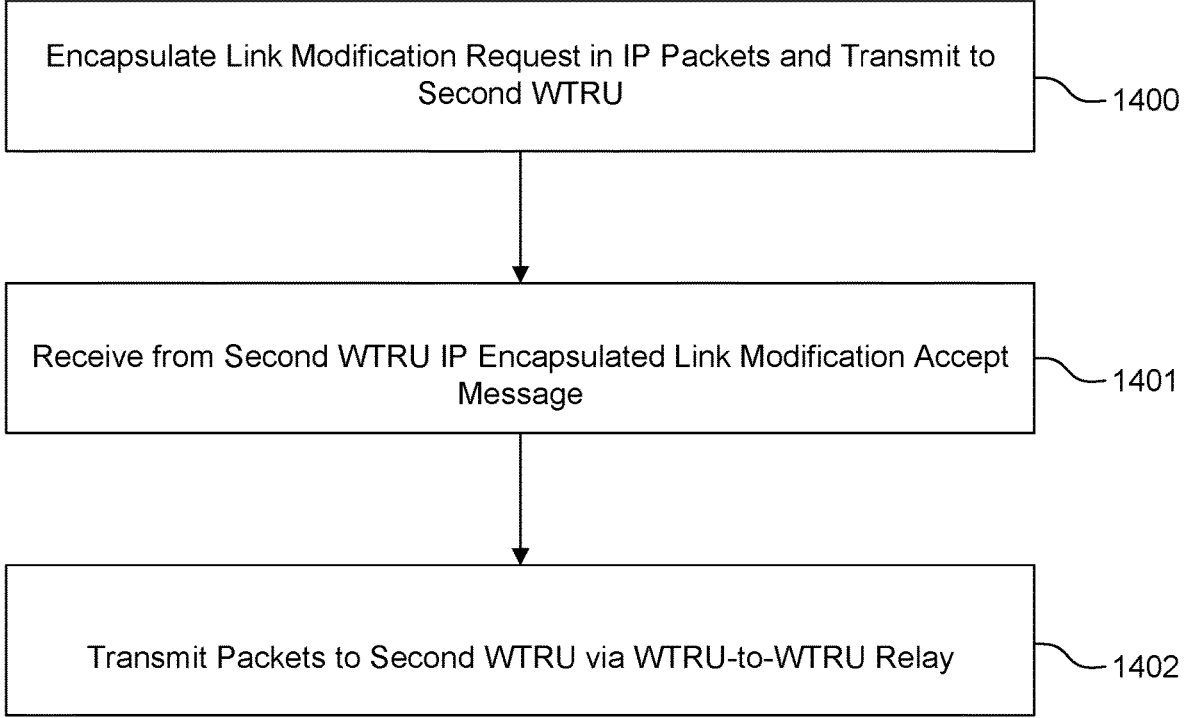
FIG. 14 is a flow chart of the embodiment illustrated in FIG. 10.

FIG. 14 is a flow chart of the embodiment illustrated in FIG. 10, related to use in a first WTRU. The method comprises: encapsulating (1400), into IP packets, a link modification request from the first WTRU for modifying a first link between the first WTRU and a second WTRU, the link modification request comprising Quality of Service, QoS, flow parameters for QoS configuration of the first link, and transmitting the encapsulated link modification request to the second WTRU; receiving (1401), from the second WTRU, an IP encapsulated link modification accept message, the link modification accept message indicating that the link modification has been accepted by the second WTRU; and transmitting (1402) packets to a WTRU-to-WTRU relay via a first QoS flow between the first WTRU and the WTRU-to-WTRU relay, for forwarding, by the WTRU-to-WTRU relay, the packets to the second WTRU via a second QoS flow between the WTRU-to-WTRU relay and the second WTRU. This also works vice versa (not shown) for transmitting packets to a WTRU-to-WTRU relay via a second QoS flow between the second WTRU and the WTRU-to-WTRU relay, for forwarding, by the WTRU-to-WTRU relay, the packets to the first WTRU via a first QoS flow between the WTRU-to-WTRU relay and the first WTRU.

According to an embodiment of the method related to use in a first WTRU, the packets comprise an identifier of the second WTRU.

According to an embodiment of the method related to use in a first WTRU, the identifier of the second WTRU is at least one of:

an IP address of the second WTRU;

an application layer user identifier.

According to an embodiment, a first wireless transmit-receive unit, WTRU, device is disclosed. The first WTRU device comprises at least one processor, a memory, and a transceiver. The at least one processor is configured to:

encapsulate, into IP packets, a link modification request from the first WTRU for modifying a first link between the first WTRU and a second WTRU, the link modification request comprising Quality of Service, QoS, flow parameters for QoS configuration of the first link, and to transmit the encapsulated link modification request to the second WTRU;

receive, from the second WTRU, an IP encapsulated link modification accept message, the link modification accept message indicating that the link modification has been accepted by the second WTRU; and transmit packets to a WTRU-to-WTRU relay via a first QoS flow between the first WTRU and the WTRU-to-WTRU relay, for forwarding, by the WTRU-to-WTRU relay, the packets to the second WTRU via a second QoS flow between the WTRU-to-WTRU relay and the second WTRU.

Conclusion

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods with different priority levels is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "WTRU" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

A processor in association with software may be used to implement a radio frequency transceiver for use in a wireless transmit receive unit (WTRU), user equipment (WTRU), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speaker-phone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for use in a wireless transmit-receive unit to wireless transmit- receive unit relay, WTRU-to-WTRU relay, the method comprising:

receiving, from a source WTRU, for a link between the source WTRU and a target WTRU via the WTRU-to-WTRU relay, the link between the source WTRU and the target WTRU comprising a first link between the source WTRU and the WTRU-to-WTRU relay and a second link between the WTRU-to-WTRU relay and the target WTRU, a first link modification request to establish a QoS flow over the link between the source WTRU and the target WTRU, the first link modification request indicating QoS flow parameters and a target WTRU identifier;

determining, based on the QoS flow parameters indicated in the first link modification request, that the WTRU-to-WTRU relay is unable to modify an existing QoS flow between the WTRU-to-WTRU relay and the target WTRU identified by the target WTRU identifier comprised in the first link modification request so as to support the QoS flow parameters indicated in the first link modification request; and transmitting, based on the WTRU-to-WTRU relay unable to modify the existing QoS flow, a second link modification request to the target WTRU, the second link modification request comprising a QoS flow establishment request for creating a new QoS flow between the WTRU-to-WTRU relay and the target WTRU, the QoS flow establishment request comprising the QoS flow parameters comprised in the first link modification request.

2. The method according to claim 1, further comprising storing a mapping of QoS flows between the source WTRU and the target WTRU, and forwarding packets received from the source WTRU to the target WTRU based on the stored mapping of QoS flows.

3. The method according to claim 1, wherein the identifier of the target WTRU is at least one of:

an IP address of the target WTRU; and an application layer user identifier.

4. The method according to claim 1, wherein the QoS flow parameters are associated with at least one of a delay and a packet loss rate.

5. A wireless transmit-receive unit to wireless transmit-receive unit relay device, WTRU-to-WTRU relay device, the WTRU-to-WTRU relay device comprising at least one processor, a memory, and a transceiver, wherein:

the at least one processor is configured to:

receive, from a source WTRU, for a link between a source WTRU and a target WTRU via the WTRU-to-WTRU relay, the link between the source WTRU and the target WTRU comprising a first link between the source WTRU and the WTRU-to-WTRU relay and a second link between the WTRU-to-WTRU relay and the target WTRU; a first link modification request to establish a QoS flow over the link between the source WTRU and the target WTRU, the first link modification request indicating QoS flow parameters and a target WTRU identifier;

determine, based on the QoS flow parameters indicated in the first link modification request, that the WTRU-to-WTRU relay is unable to modify an existing QoS flow between the WTRU-to-WTRU relay and the target WTRU identified by the target WTRU identifier comprised in the first link modification request cannet be modified so as to support the QoS flow parameters indicated in the first link modification request; and transmit, based on the WTRU-to-WTRU relay unable to modify the existing QoS flow, a second link modification request to the target WTRU, the second link modification request comprising a QoS flow establishment request for creating a new QoS flow between the WTRU-to-WTRU relay and the target WTRU, the QoS flow establishment request comprising the second QoS flow parameters comprised in the first link modification request.

6. The WTRU-to-WTRU relay device according to claim 5, wherein the at least one processor is configured to store a mapping of QoS flows between the source WTRU and the target WTRU in the memory, and to forward packets received from the source WTRU to the target WTRU based on the stored mapping of QoS flows.

7. The WTRU-to-WTRU relay device according to claim 5, wherein the QoS flow parameters are associated with at least one of a delay and a packet loss rate.

* * * * *